United States Patent
Kikuchi et al.

(10) Patent No.: US 10,977,300 B2
(45) Date of Patent: Apr. 13, 2021

(54) INDEX GENERATING METHOD, MEASURING METHOD, AND INDEX GENERATING APPARATUS

(71) Applicant: FUJIFILM Corporation, Tokyo (JP)

(72) Inventors: Hiroaki Kikuchi, Tokyo (JP); Masashi Kuranoshita, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 97 days.

(21) Appl. No.: 16/162,611

(22) Filed: Oct. 17, 2018

(65) Prior Publication Data

US 2019/0050401 A1 Feb. 14, 2019

Related U.S. Application Data

(63) Continuation of application No. PCT/JP2017/014823, filed on Apr. 11, 2017.

(30) Foreign Application Priority Data

Apr. 27, 2016 (JP) .............................. JP2016-089556

(51) Int. Cl.
  *G06F 16/51* (2019.01)
  *G01B 11/02* (2006.01)
  (Continued)

(52) U.S. Cl.
  CPC .............. *G06F 16/51* (2019.01); *G01B 11/02* (2013.01); *G06F 17/18* (2013.01); *G06T 3/60* (2013.01); *G06T 7/001* (2013.01); *G06T 7/60* (2013.01)

(58) Field of Classification Search
  CPC ........... G06T 1/00; G06T 7/74; G06T 7/0014; G06T 7/00; G06T 7/001; G06T 7/75;
  (Continued)

(56) References Cited

U.S. PATENT DOCUMENTS 6,021,383 A * 2/2000 Domany ................ G06K 9/622
  702/181
6,711,284 B1 3/2004 Koide
  (Continued)

FOREIGN PATENT DOCUMENTS

CN 2881539 Y 3/2007
CN 101263362 A 9/2008
  (Continued)

OTHER PUBLICATIONS

International Search Report issued in PCT/JP2017/014823; dated Jul. 4, 2017.
  (Continued)

*Primary Examiner* — Santiago Garcia
(74) *Attorney, Agent, or Firm* — Studebaker & Brackett PC

(57) ABSTRACT

An object of the present invention is to provide an index generating method and index generating apparatus capable of accurately and stably generating an index for measuring a width of a subject, and a measuring method capable of accurately and stably measuring a width of a subject. An index generating method according to one embodiment of the present invention includes: an image input step of inputting an image obtained by imaging a linear subject; a density distribution acquiring step of acquiring, from the input image, a plurality of density distributions along a direction orthogonal to a width direction of the linear subject, which are density distributions in the width direction of the linear subject; a function calculating step of calculating a probability distribution function corresponding to the acquired plurality of density distributions; and an index generating step of generating an index indicating a width of the subject based on the calculated probability distribution function.

14 Claims, 16 Drawing Sheets

(51) Int. Cl.
*G06F 17/18* (2006.01)
*G06T 3/60* (2006.01)
*G06T 7/00* (2017.01)
*G06T 7/60* (2017.01)

(58) Field of Classification Search
CPC .... G06T 3/60; G06T 7/60; G06T 7/55; G06T 2207/20081; G06F 19/321; G06F 17/18; G06F 16/51; G06F 16/35; G16H 30/20; G16H 50/80; G16H 50/50; H04N 21/252; A61B 2576/00; G08B 13/19613; B64D 39/00; B64D 47/00; B64G 1/646; G01S 17/18; G01S 17/88; G01S 17/89; G01S 7/481; G01S 7/4863; G01S 7/4868; G01S 17/58; G06K 9/6215; G06K 9/6272; G06K 9/00664; G05D 1/0272; G05D 1/0274; G05D 1/0255; G01T 1/1663; G06N 3/02; A61M 2021/005
USPC .............. 382/141, 194, 190, 203, 275, 286; 356/625, 635
See application file for complete search history.

(56) References Cited

U.S. PATENT DOCUMENTS

| | | | | |
|---|---|---|---|---|
| 6,763,129 | B1* | 7/2004 | Honda | G06K 9/40 382/132 |
| 8,855,375 | B2* | 10/2014 | Macciola | H04N 1/387 382/112 |
| 8,976,340 | B2* | 3/2015 | Gilliland | G01S 17/88 356/5.01 |
| 2004/0167667 | A1* | 8/2004 | Goncalves | G01C 21/12 700/245 |
| 2005/0182518 | A1* | 8/2005 | Karlsson | G06K 9/6296 700/253 |
| 2006/0147128 | A1* | 7/2006 | Kondo | G06T 7/12 382/300 |
| 2007/0019846 | A1* | 1/2007 | Bullitt | G06T 7/0014 382/128 |
| 2007/0098289 | A1* | 5/2007 | Kondo | G06T 5/003 382/254 |
| 2008/0114564 | A1* | 5/2008 | Ihara | G06K 9/6215 702/158 |
| 2009/0135401 | A1 | 5/2009 | Nakaniwa | |
| 2010/0043576 | A1 | 2/2010 | Craig | |
| 2010/0309309 | A1 | 12/2010 | Bing | |
| 2011/0149268 | A1* | 6/2011 | Marchant | G01S 17/58 356/27 |
| 2011/0194175 | A1* | 8/2011 | Dougherty | G02B 26/105 359/386 |
| 2012/0106782 | A1* | 5/2012 | Nathan | G08B 21/14 382/103 |
| 2015/0065803 | A1* | 3/2015 | Douglas | G06T 7/11 600/200 |
| 2015/0106311 | A1* | 4/2015 | Birdwell | G06N 3/10 706/20 |
| 2016/0282821 | A1* | 9/2016 | Chen | G06K 9/00 |
| 2018/0112054 | A1* | 4/2018 | Steiner, III | C08G 18/3243 |
| 2019/0050401 | A1* | 2/2019 | Kikuchi | G06F 16/51 |

FOREIGN PATENT DOCUMENTS

| | | |
|---|---|---|
| CN | 109073362 A | 12/2018 |
| JP | 2001-124522 A | 5/2001 |
| JP | 2011508880 A | 3/2011 |
| JP | 2013-195074 A | 9/2013 |
| JP | 2013-238449 A | 11/2013 |

OTHER PUBLICATIONS

Written Opinion issued in PCT/JP2017/014823; dated Jul. 4, 2017.
International Preliminary Report on Patentability issued in PCT/JP2017/014823; dated Oct. 30, 2018.
Koki Konomi et al., "Crack Extraction from the Road Picture in Road Diagnostic Analysis", IEICE Technical Report, Feb. 17, 2014 (Feb. 17, 2014).
The extended European Search Report issued by the European Patent Office dated Jan. 29, 2019, which corresponds to EP 17789253.6-1210 and is related to U.S. Appl. No. 16/162,611.
Paul Dare et al: "An Operational Application of Automatic Feature Extraction: The Measurement of Cracks in Concrete Structures", Photogrammetric Record, vol. 17, No. 99, Apr. 1, 2002.
Mohammad R Jahanshahi et al., "Paper; A new 1-15 methodology for non-contact accurate crack width measurement through photogrammetry for automated structural safety evaluation; A new methodology for non-contact accurate crack width measurement through photogrammetry for automated structural safety evaluation", Smart Materials and Structures, IOP Publishing Ltd., Bristol, GB, vol. 22, No. 3, Feb. 15, 2013.
Wolfgang Niemeier et al., New Digital Crack Monitoring System for Measuring and Documentation of Width of Cracks in Concrete Structures, 13th Fig Symposium on Deformation Measurement and Analysis, May 12-15, 2008, pp. 1-9, Lisbon.
Communication pursuant to Article 94(3) EPC issued by the European Patent Office dated Apr. 3, 2020, which corresponds to European Patent Application No. 17 789 253.6-1210 and is related to U.S. App. No. 16/162,611.
Carmen Alina Lupascu et al., Accurate estimation of retinal vessel width using bagged decision trees and an extended multiresolution Hermite model, Medical Image Analysis, Dec. 1, 2013, pp. 1164-1180, ELSEVIER.
An Office Action mailed by the State Intellectual Property Office of the People's Republic of China dated Nov. 29, 2019, which corresponds to Chinese Patent Application No. CN201780025495.5.

* cited by examiner

INDEX GENERATING METHOD, MEASURING METHOD, AND INDEX GENERATING APPARATUS

CROSS-REFERENCE TO RELATED APPLICATIONS

The present application is a Continuation of PCT International Application No. PCT/JP2017/014823 filed on Apr. 11, 2017 claiming priority under 35 U.S.C § 119(a) to Japanese Patent Application No. 2016-089556 filed on Apr. 27, 2016. Each of the above applications is hereby expressly incorporated by reference, in their entirety, into the present application.

BACKGROUND OF THE INVENTION

1. Field of the Invention

The present invention relates to a method and apparatus for generating an index for measuring a width from an image of a subject, and a method for measuring a width of a subject using such an index.

2. Description of the Related Art

Various kinds of damage such as cracks occur in structures such as bridges, tunnels, roads, and buildings, and progress with time. Accordingly, in order to ensure the safety of the structure, it is necessary to perform repair according to the situation of the damage. The inspection of damage in the related art has been performed by visual observation by an operator or by inspection using the equipment. However, in recent years, inspection using image processing has been conducted due to problems such as working time and cost, and environment of a workplace.

As a technique for inspecting damage by image processing, there is known a technique of visually measuring cracks using an image obtained by capturing a crack scale (scale for measuring the crack) on which marks having a length or width known are displayed together with damage, or a technique of visually measuring cracks by superimposing an image of a crack scale on the captured image. Instead of measuring cracks directly using a crack scale as in these techniques, there is also known a technique for measuring cracks by indexing the crack scale. For example, JP2013-195074A describes that a light and shade distribution acquired by imaging a crack scale is indexed and used for estimation of a crack width.

SUMMARY OF THE INVENTION

However, in the above-mentioned JP2013-195074A, since light and shade data in several points are acquired in the width direction of a crack and a single light and shade distribution in which these light and shade data are directly connected by a straight line is indexed, the obtained index has only the degree of accuracy obtained by triangle approximation of the light and shade distribution and thus it was impossible to estimate the crack width with high accuracy. Since a cutting line (light and shade data acquisition position) set for one scale is used only at one point, the influence on the index by the measurement environment of the crack scale (distance to the scale or exposure conditions, color or brightness around the scale, or the like) was great. JP2013-195074A only describes the measurement of cracks generated in a structure, but has mentioned nothing about other subjects. As described above, in the technique of the related art, it has been difficult to accurately and stably measure the width of the subject using the index.

The present invention has been made in view of the above circumstances, and an object of the present invention is to provide an index generating method and index generating apparatus capable of accurately and stably generating an index for measuring the width of a subject, and a measuring method capable of accurately and stably measuring the width of a subject.

In order to achieve the above-mentioned object, an index generating method according to a first aspect of the present invention comprises: an image input step of inputting an image obtained by imaging a linear subject; a density distribution acquiring step of acquiring, from the input image, a plurality of density distributions along a direction orthogonal to a width direction of the linear subject, which are density distributions in the width direction of the linear subject; a function calculating step of calculating a probability distribution function corresponding to the acquired plurality of density distributions; and an index generating step of generating an index indicating a width of the subject based on the calculated probability distribution function.

According to the first aspect, since an index is generated based on a probability distribution function corresponding to the plurality of density distributions, it is possible to accurately and stably generate the index by reducing the influence of a measurement environment and noise. According to the first aspect, by generating an index for a subject having a width known by other methods or the like, it is possible to recognize the relationship between the width of the subject and the index.

In the first aspect, it is preferable to acquire a plurality of density distributions for a subject having a constant width or a portion having a constant width out of a subject. Here, that a width is "constant" is not limited to a case where the width is perfectly constant, but may be changed according to the accuracy of the generated index. In the first aspect, letters, numbers, symbols, images, or the like indicating the width of the subject may be used as an index.

According to the first aspect, it is possible to generate an index for a linear subject such as cracks of structures (bridges, tunnels, roads, buildings, or the like), blood vessels in living bodies, rivers, trees, and wirings used for electrical and electronic circuits. In the first aspect, that the subject is "linear" means that a length in a specific direction (a traveling direction) is sufficiently long relative to a length in a direction (a width direction) orthogonal to the specific direction.

In the first aspect, it is possible to input an image obtained by imaging a subject or input the captured image.

The index generating method according to a second aspect, in the first aspect, further comprises: an integrating step of integrating the calculated probability distribution function, in which in the index generating step, an index is generated based on a result of the integration. The second aspect defines one aspect of the index, and it is possible to generate, for example, a numerical value indicating the result (area) of the integration as an index.

The index generating method according to a third aspect, in the first aspect, is configured such that, in the index generating step, a parameter indicating the calculated probability distribution function is generated as an index. The third aspect defines another aspect of the index, and it is possible to generate, for example, a parameter indicating the shape of the graph of the probability distribution function as an index. In the third aspect, one or a plurality of parameters may be used.

The index generating method according to a fourth aspect, in the first aspect, is configured such that, in the index generating step, a two-dimensional image indicating the calculated probability distribution function is generated as an index. The fourth aspect defines another aspect of the index, and it is possible to generate, for example, a two-dimensional image having a pattern of light and shade corresponding to the probability distribution function as an index.

The index generating method according to a fifth aspect, in any one of the first to fourth aspects, is configured such that, in the index generating step, an index is generated according to a width of the subject and a distance to the subject. In the fifth aspect, since the index is generated according to a width of the subject and a distance to the subject, an accurate index may be generated.

The index generating method according to a sixth aspect, in any one of the first to fifth aspects, further comprises: a correcting step of correcting the generated index based on information about the subject. According to the sixth aspect, since the generated index is corrected based on the information about the subject, it is possible to obtain an index with high accuracy by reducing the influence of the measurement environment.

The index generating method according to a seventh aspect, in the sixth aspect, is configured such that the information includes at least one of a distance to the subject, a brightness around the subject, or a color around the subject. The seventh aspect defines a specific example of information for correcting the index.

The index generating method according to an eighth aspect, in any one of the first to seventh aspects, further comprises: an image rotating step of rotating the input image such that the linear subject is disposed in a vertical direction of a front image, in which in the density distribution acquiring step, a plurality of density distributions are acquired along the vertical direction of the rotated image. By rotating the image as in the eighth aspect, it is possible to easily obtain a plurality of density distributions. The front image means an image captured from the front of the subject (an image in which a capturing direction is perpendicular to an imaging area).

The index generating method according to a ninth aspect, in any one of the first to eighth aspects, further comprises: a center estimating step of estimating a center in a width direction of a density distribution for each of a plurality of density distributions; and an aligning step of aligning centers by moving the plurality of density distributions in the width direction based on the estimated center, in which in the function calculating step, a probability distribution function corresponding to a plurality of density distributions having the aligned centers is calculated. In the ninth aspect, since the probability distribution function corresponding to a plurality of density distributions having the aligned centers is calculated and an index indicating the probability distribution function is generated, it is possible to calculate the probability distribution and generate the index based on the calculation with high accuracy. The center of the density distribution may be estimated, for example, by approximating the density distribution into a curve, and the peak of the curve is used as the center.

The index generating method according to a tenth aspect, in any one of the first to ninth aspects, is configured such that, in the function calculating step, a probability distribution function is calculated by performing a regression analysis on a plurality of density distributions. The tenth aspect defines one aspect of a method of calculating a probability distribution function from a plurality of density distributions.

The index generating method according to an eleventh aspect, in any one of the first to tenth aspects, further comprises: an imaging step of imaging a linear subject to acquire an image, in which in the image input step, the image acquired in the imaging step is input. The eleventh aspect defines the acquisition of the image of the subject as the configuration of the index generating method.

The index generating method according to the twelfth aspect, in any one of the first to eleventh aspects, is configured such that the subject is a crack of the structure. The twelfth aspect defines a specific example of a subject.

In order to achieve the above-mentioned object, a measuring method according to a thirteenth aspect of the present invention comprises: a reference index generating step of generating an index by using an index generating method according to any one of the first to twelfth aspects, for a reference subject having a width known; a target index generating step of generating, for comparison with the index, a second index for a target subject which is a target to be measured; and a measuring step of measuring the width of the target subject by comparing the second index generated for the target subject with the index generated for the reference subject.

According to the thirteenth aspect, by comparing an index generated by the index generating method according to any one of the first to twelfth aspects for the reference subject, with the second index generated for the target subject, it is possible to accurately measure the width of the subject or reduce the influence of the measurement environment. In the thirteenth aspect, in the target index generating step, the second index may be generated by the same method as in the reference index generating step, but in a case where the second index is generated, the density distribution may be acquired at least one portion.

In the thirteenth aspect, it is assumed that the subject is a subject whose width is measured by a method different from the method of the reference subject, or whose width is known by the artificial creation or the like and the subject may be the same type as the target subject or different from the target subject. For example, in a case where the target subject is a crack of a structure, an actual crack may be used as the reference subject, or an artificially-created crack or scale may be used as the reference subject. Here, that "a width is known" for the reference subject means that there may be uncertainty in width according to necessary index generation accuracy and measurement accuracy.

The measuring method according to a fourteenth aspect, in the thirteenth aspect, further comprises: a display step of displaying information indicating a width obtained by measurement. According to the fourteenth aspect, by displaying the information indicating the width, it is possible to easily visually recognize the measurement results. For example, letters, numbers, symbols, and colors may be used as "information indicating a width", and letters, numbers, symbols, colors, or the like may be changed depending on the width. The "information indicating a width" may be displayed in association with the image of the subject.

In addition to the index generating method and the measuring method according to the above-mentioned aspects, one embodiment of the present invention also includes a program that causes an index generating apparatus or a measuring apparatus to execute such an index generating method and measuring method and a non-transitory recording medium in which computer readable codes of such a program are recorded. Examples of such a non-transitory recording medium include optical discs such as a Compact Disk (CD) and a Digital Versatile Disk (DVD), magnetic recording apparatus such as Hard Disk (HD), and various types of semiconductor recording media, but are not limited thereto.

In order to achieve the above-mentioned object, an index generating apparatus according to a fifteenth aspect of the present invention comprises: an image input unit that inputs an image obtained by imaging a linear subject; a density distribution acquiring unit that acquires, from the input image, a plurality of density distributions along a direction orthogonal to a width direction of the linear subject, which are density distributions in the width direction of the linear subject; a function calculating unit that calculates a probability distribution function corresponding to the acquired plurality of density distributions; and an index generating unit that generates an index indicating a width of the subject based on the calculated probability distribution function. According to the fifteenth aspect, similarly to the first aspect, it is possible to accurately and stably generate an index for measuring the subject. In the fifteenth aspect, a structure similar to structures of the second to fourteenth aspects may be further included.

As described above, according to the index generating method and the index generating apparatus of the present invention, it is possible to accurately and stably generate an index for measuring the width of the subject. Thus, according to the measuring method of the present invention, it is possible to accurately and stably measure the width of the subject.

DESCRIPTION OF THE PREFERRED EMBODIMENTS

Hereinafter, embodiments of an index generating method, a measuring method, and an index generating apparatus according to the embodiment of the present invention will be described with reference to the accompanying drawings.

<Structure of Bridge>

Figure 1:
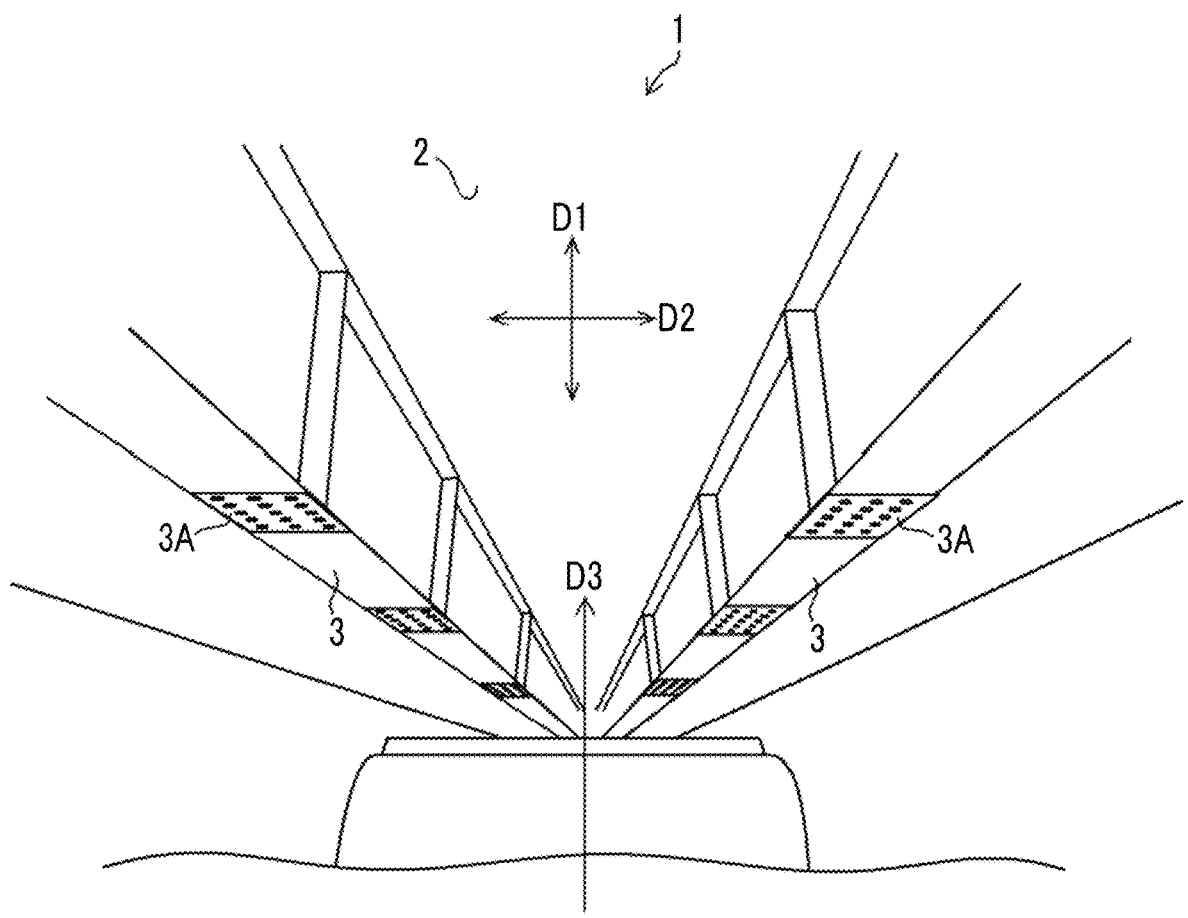
FIG. 1 is a diagram showing a bridge which is an example of a target to which the present invention is applied.

FIG. 1 is a perspective view showing a structure of a bridge 1 (a structure or a concrete structure) which is an example of a structure to which an index generating method, a measuring method, and an index generating apparatus according to the embodiment of the present invention are applied. The bridge 1 shown in FIG. 1 has a main girder 3, and the main girder 3 is joined at a joint portion 3A. The main girder 3 is passed between an abutment and/or bridge pier and is a member for supporting a load of the vehicle or the like on a deck 2. On the upper part of the main girder 3, a deck 2 for traveling a vehicle or the like is disposed. The deck 2 is made of reinforced concrete. In addition to the deck 2 and the main girder 3, the bridge 1 has members such as a transverse girder, a cross frame, and a lateral frame (not shown).

<Acquisition of Image>

In the case of inspecting the damage of the bridge 1, an inspector images the bridge 1 from below (direction D3 in FIG. 1) using a camera 102 (see FIG. 2) and acquires an image in the inspected range. While moving in an extending direction of the bridge 1 (direction D1 in FIG. 1) and a direction orthogonal to the extending direction (direction D2 in FIG. 1) is performed, imaging is performed. In a case where it is difficult for the inspector to move under the surrounding condition of the bridge 1, the camera 102 may be provided on a mobile vehicle that may move along the bridge 1 to perform imaging. Such a mobile vehicle may be provided with an elevating mechanism and/or a pan/tilt mechanism of the camera 102. Examples of the mobile vehicle include a vehicle, a robot, and a flight vehicle, but the present invention is not limited thereto. Imaging may be performed in response to an instruction input to the camera 102 by the inspector (for example, a depression operation of a release button), or may be automatically performed by an image acquiring unit 110A which is in control of the camera 102.

<Structure of Measuring Apparatus>

Figure 2:
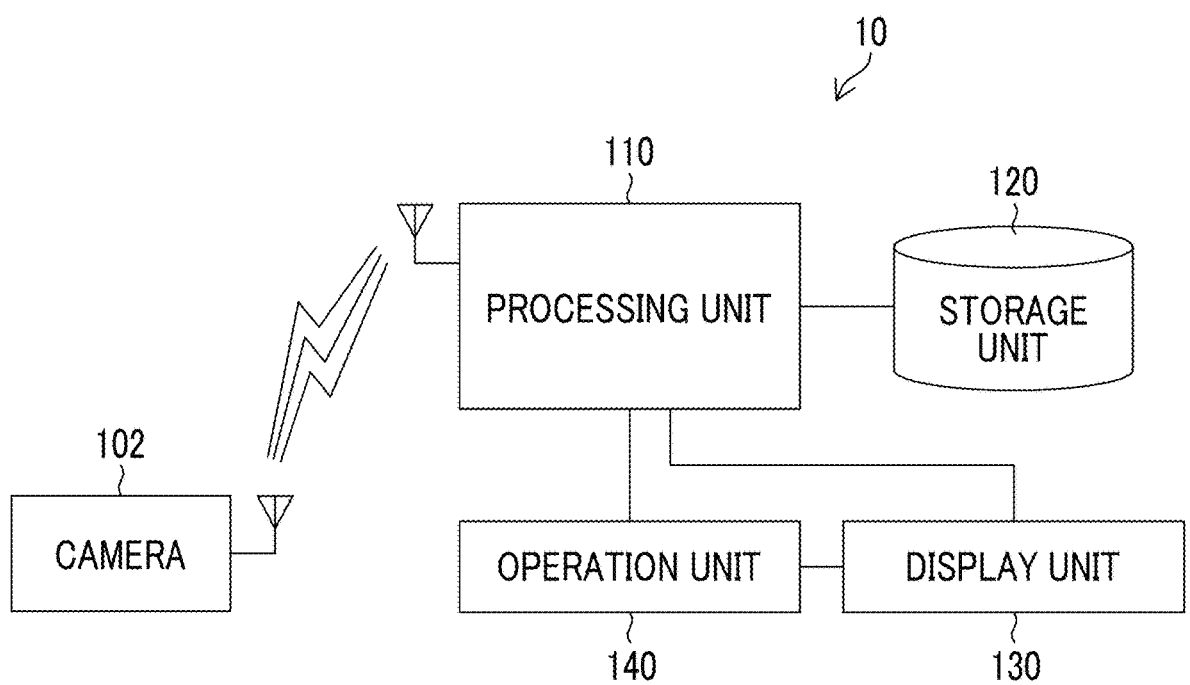
FIG. 2 is a block diagram showing a configuration of a measuring apparatus according to an embodiment of the present invention.

FIG. 2 is a diagram showing the configuration of a measuring apparatus 10 (index generating apparatus, or measuring apparatus) according to the embodiment of the present invention. The measuring apparatus 10 comprises a processing unit 110, a storage unit 120, a display unit 130, and an operation unit 140, and the processing unit 110 is wirelessly connected to the camera 102. The camera 102 is composed of a digital camera and acquires an image of the bridge 1 as described above. A digital camera capable of acquiring a stereo image may be used as the camera 102 and a distance from the acquired stereo image to the subject may be estimated.

<Structure of Processing Unit>

Figure 3:
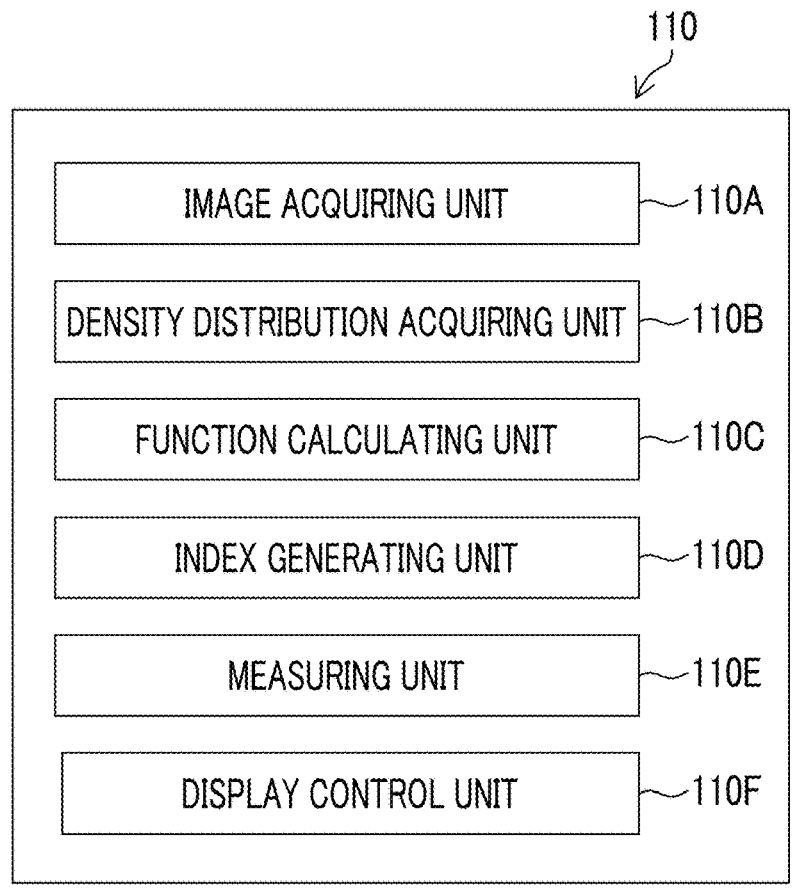
FIG. 3 is a diagram showing a functional configuration of a processing unit.

FIG. 3 is a diagram showing a main functional configuration of the processing unit 110. The processing unit 110 comprises an image acquiring unit 110A, a density distribution acquiring unit 110B, a function calculating unit 110C, an index generating unit 110D, a measuring unit 110E, and a display control unit 110F. Devices such as a Central Processing Unit (CPU) and various electronic circuits execute a program stored in a Read Only Memory (ROM) (non-transitory recording medium) or the like while appropriately referring to image information stored in the storage unit 120 and data stored in an Electronically Erasable and Programmable Read Only Memory (EEPROM) (non-transitory recording medium), thereby performing these functions (each processing of the index generating method and the measuring method). At the time of processing, a Random Access Memory (RAM) or the like is used as a temporary storage area or a work area. These devices are not shown in FIG. 3.

The image acquiring unit 110A controls the camera 102 to acquire an image of cracks generated in the bridge 1. The camera 102 and the image acquiring unit 110A configure an image input unit in the index generating apparatus and the measuring apparatus according to the embodiment of the present invention. The density distribution acquiring unit 110B (density distribution acquiring unit) acquires a density distribution in a width direction of a crack along the traveling direction of the crack (a length direction; a direction orthogonal to the width direction). The function calculating unit 110C (function calculating unit) calculates a probability distribution function corresponding to the density distribution. The index generating unit 110D (index generating unit) generates an index indicating the width of a subject based on the probability distribution function. The measuring unit 110E (measuring unit) measures the width of a crack as a target to be measured by comparing an index generated for a crack as a reference with another index generated for the crack as the target to be measured. The display control unit 110F controls to display the acquired image, generated indices, or the like on the display unit 130.

<Configuration of Storage Unit>

Figure 4:
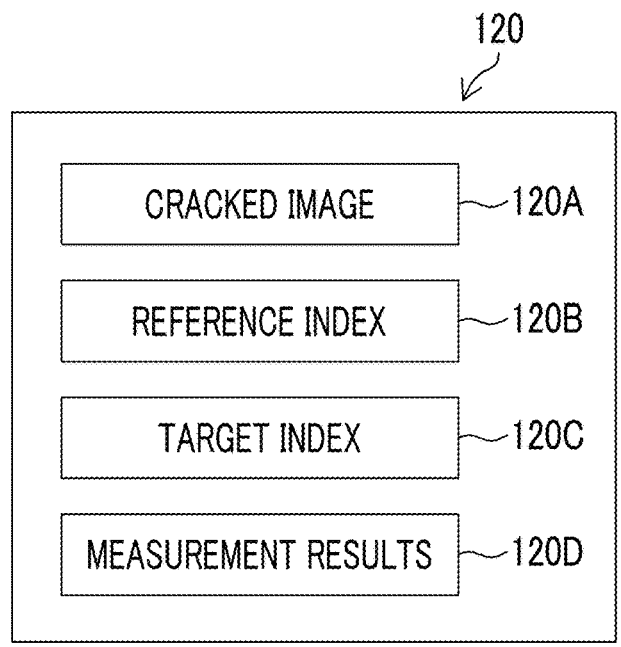
FIG. 4 is a diagram showing information stored in a storage unit.

The storage unit 120 is composed of non-transitory recording media such as a Compact Disk (CD), a Digital Versatile Disk (DVD), a Hard Disk, and various semiconductor memories, and stores the image and information shown in FIG. 4 in association with each other. A cracked image 120A is an image which is obtained by capturing cracks generated in the bridge 1 (for example, deck 2) using the camera 102, and then is input by the image acquiring unit 110A. Not only images input by the camera 102 and the image acquiring unit 110A but also images of cracks acquired through a network or a recording medium may be stored. A reference index 120B is an index indicating a width of a crack generated by the index generating method according to the embodiment of the present invention for a reference subject (crack, crack scale, or the like) having a width known. A target index 120C is an index (second index) indicating a width of a crack generated by the index generating method according to the embodiment of the present invention with respect to a target subject (crack of a target to be measured). Measurement results 120D are information indicating the width of a crack (numerical value, relationship with a threshold value, or the like), and are stored in association with the cracked image (for example, which image has the width of the crack).

In a case of processing by the processing unit 110, reading and writing of the above-described image or information are performed between the processing unit 110 and the storage unit 120.

<Structure of Display Unit and Operation Unit>

The display unit 130 includes a display device (not shown) such as a liquid crystal display, and may display the input images, or images and information stored in the storage unit 120, indices generated by the processing unit 110, or the like. The operation unit 140 includes a pointing device such as a mouse and an input device (not shown) such as a keyboard, and a user may operate an image, a button, or the like displayed on the display unit 130 through the operation unit 140.

<Generation of Index>

Next, an index generation (index generating method) by the measuring apparatus 10 (index generating apparatus, and measuring apparatus) having the above-described configuration will be described. Herein, a case where a crack having a width known is used as a reference subject to generate an index will be described. As the reference subject, a subject whose width is measured by different methods or whose width is artificially created and so on to be known is used. Here, that "the width is known" for the reference subject also includes the case where there is uncertainty in width according to the requirement for index generation accuracy and measurement accuracy.

Figure 5:
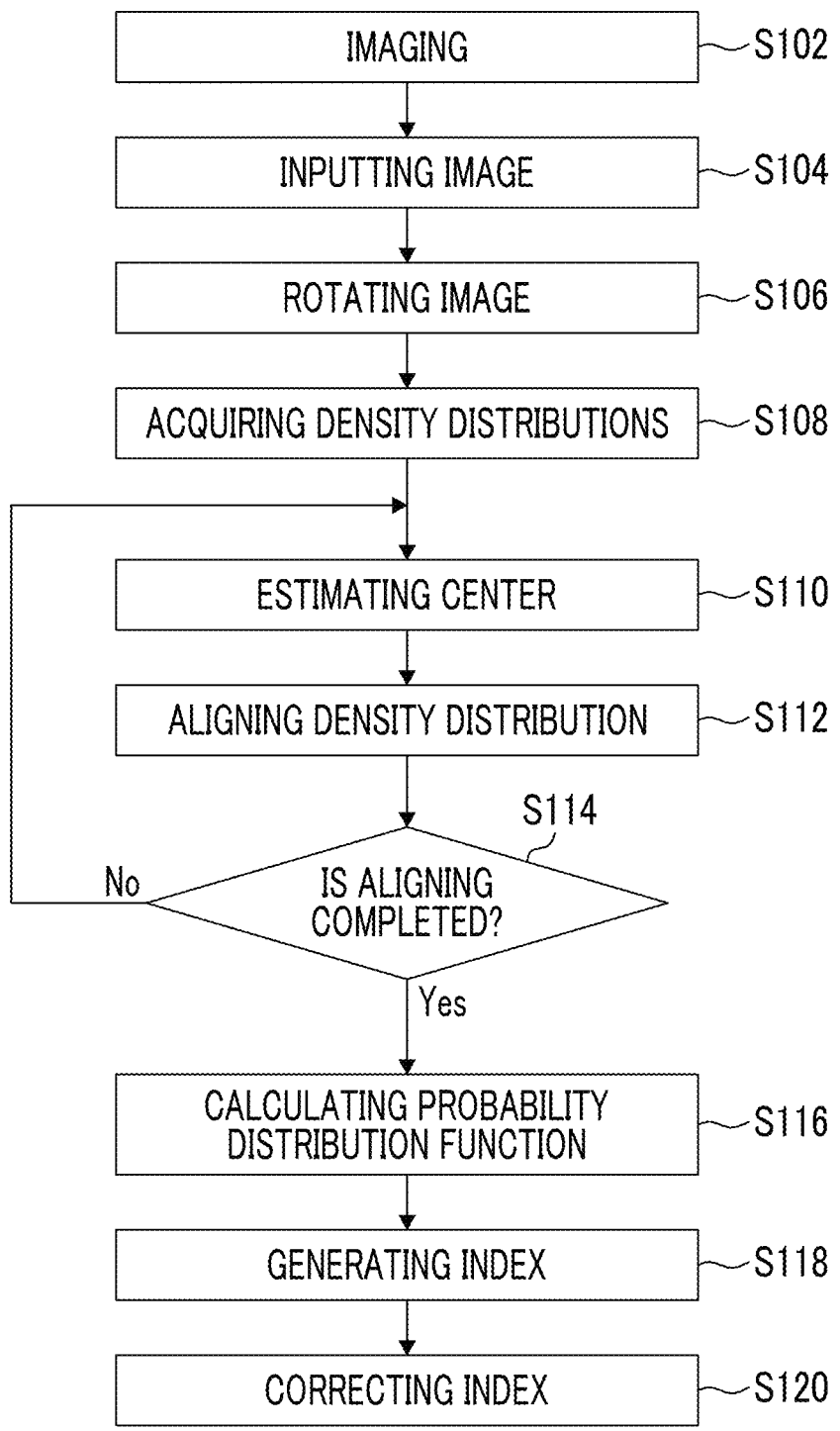
FIG. 5 is a flowchart showing processing of an index generating method according to an embodiment of the present invention.
Figure 6:
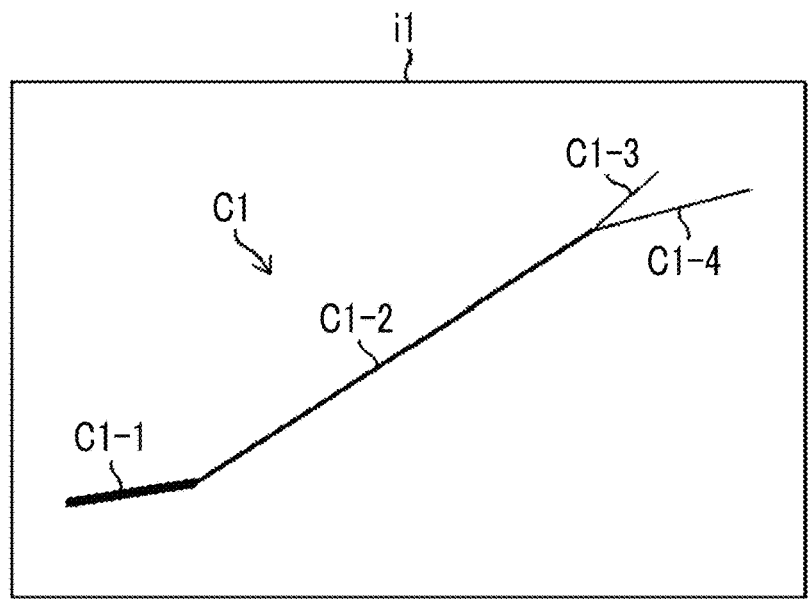
FIG. 6 is a diagram showing an image of cracks as an example of a reference subject.

FIG. 5 is a flowchart showing procedures for the processing of index generation. First, the camera 102 images a crack (an example of a linear subject) generated in the bridge 1 (deck 2) in response to an instruction input by an inspector (for example, a depression operation of the release button) and acquires an image (step S102: imaging step). The acquisition of image may be automatically performed under the control of the image acquiring unit 110A. FIG. 6 is a diagram showing an example of a captured image, and shows an image i1 in which a crack group C1 consisting of cracks C1-1 to C1-4 is captured as a subject. The widths of the cracks C1-1 to C1-4 are respectively assumed to be known by other measuring methods.

The image acquiring unit 110A inputs an image (herein, the image i1) obtained by imaging (step S104: image input step). Processing such as movement correction or the like may be performed on the input image as necessary. The number of images to be input may be one or more, and in a case where a plurality of images are input, one image may be generated by combining (connecting) the images.

Figure 7:
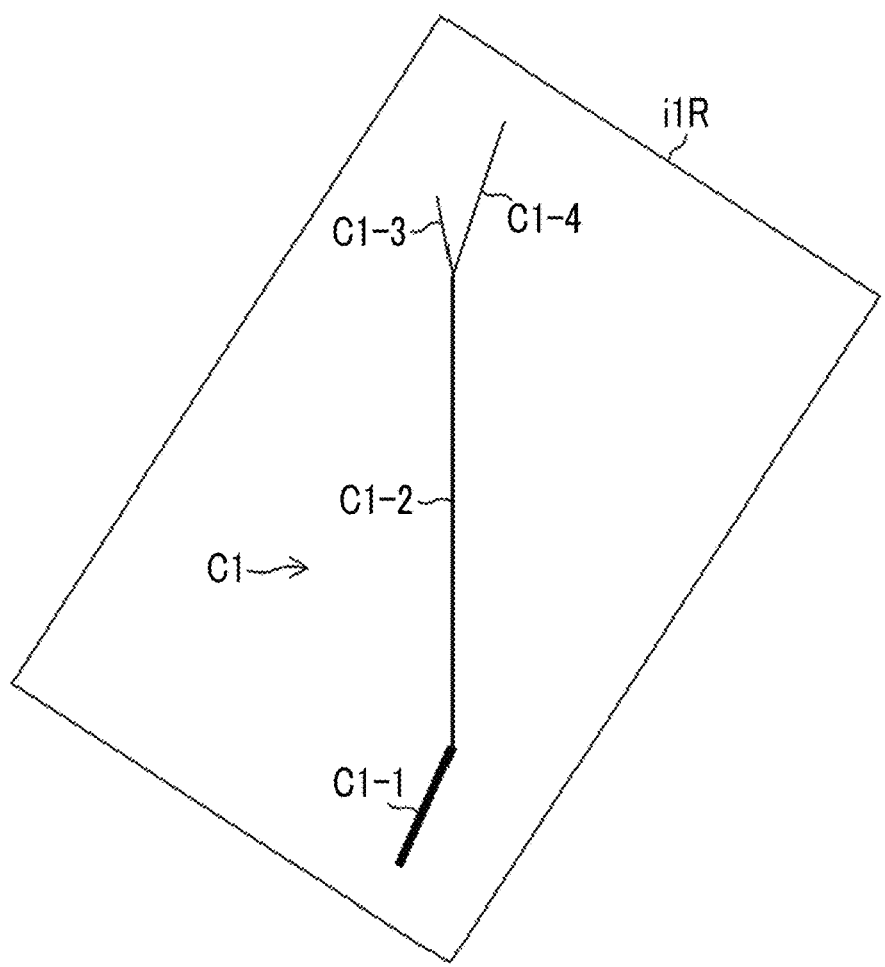
FIG. 7 is a diagram showing a state in which the image of cracks is rotated.

The processing unit 110 (density distribution acquiring unit 110B) rotates the image input in step S104 such that a crack is disposed in the vertical direction of the front image (step S106: image rotating step). Herein, the image i1 is rotated such that a crack C1-2 is disposed in the vertical direction. FIG. 7 shows an image (image i1R) obtained by rotation. In step S106, it is possible to vectorize the crack C1-2 and rotate the image it such that the direction of vectors is directed to the vertical direction. By rotating the image in this way, it is possible to easily acquire a plurality of density distributions. The front image means an image captured from the front of the subject (an image in which a capturing direction is perpendicular to an imaging area).

Figure 8:
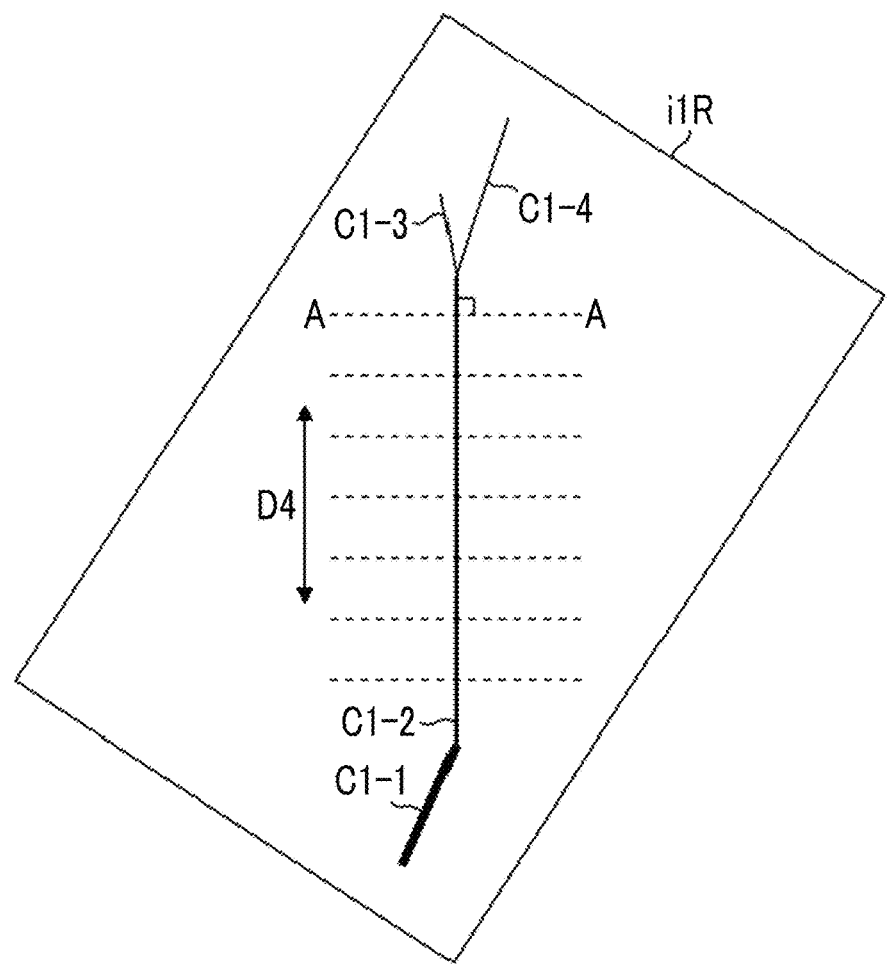
FIG. 8 is a diagram showing a state in which a plurality of density distributions are acquired along a direction orthogonal to a width direction of a crack.

With respect to the rotated image i1R, the density distribution acquiring unit 110B acquires a plurality of density distributions in the width direction of the crack C1-2 along the direction orthogonal to the width direction (step S108: density distribution acquiring step). FIG. 8 shows a state in which density distributions are acquired. In FIG. 8, a plurality of density distributions in the width direction of the crack C1-2 are acquired along the direction orthogonal to the width direction (the direction of an arrow D4). The dotted lines in FIG. 8 are the acquisition position of the density distributions.

Figure 9:
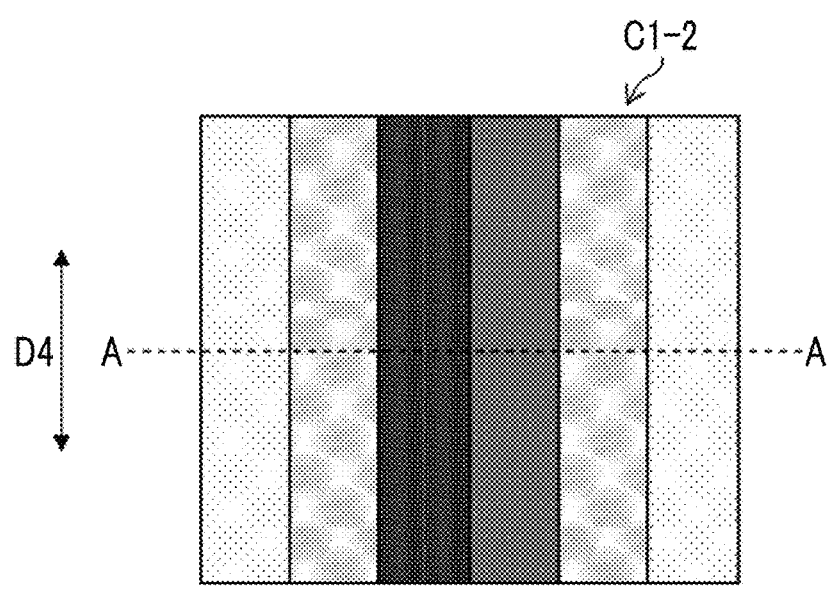
FIG. 9 is a diagram showing a state in which a portion of a crack is enlarged.

FIG. 9 is an enlarged view of the cracked portion C1-2 in the vicinity of the line A-A, and simulates the density at each pixel position. In FIG. 9, it is assumed that the density at the portion of the line A-A in FIG. 8 is acquired.

Figure 10:
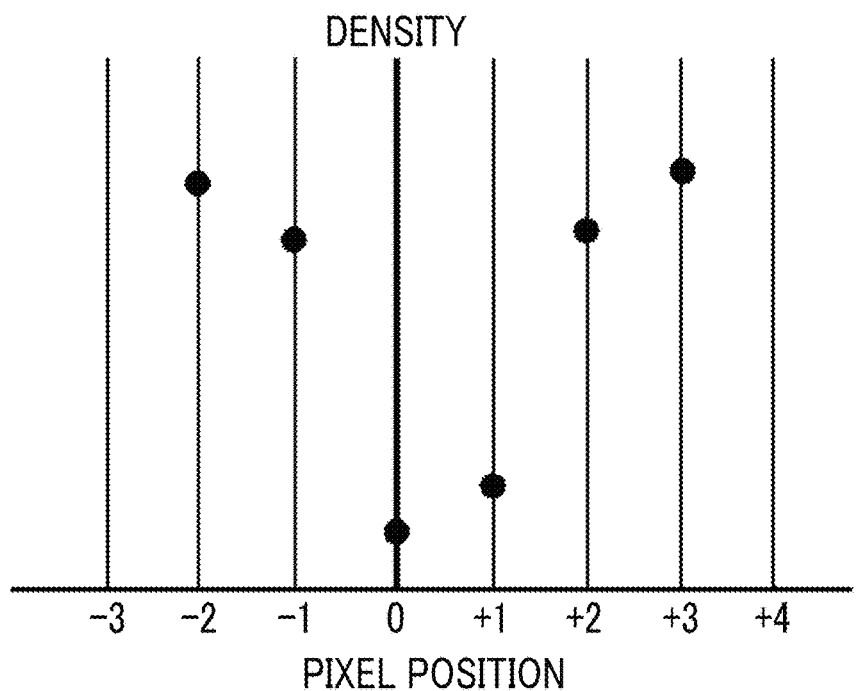
FIG. 10 is a diagram showing an example of a density distribution (density at each pixel position).

FIG. 10 shows an example of the density distribution acquired as in FIG. 9. In FIG. 10, a horizontal axis indicates a pixel position (integer value), and a vertical axis indicates density. A black circle in FIG. 10 is density at each pixel position, which indicates a state of being brighter (gradation value is large) toward the upward direction and being darker (gradation value is small) toward the downward direction in FIG. 10.

Figure 11:
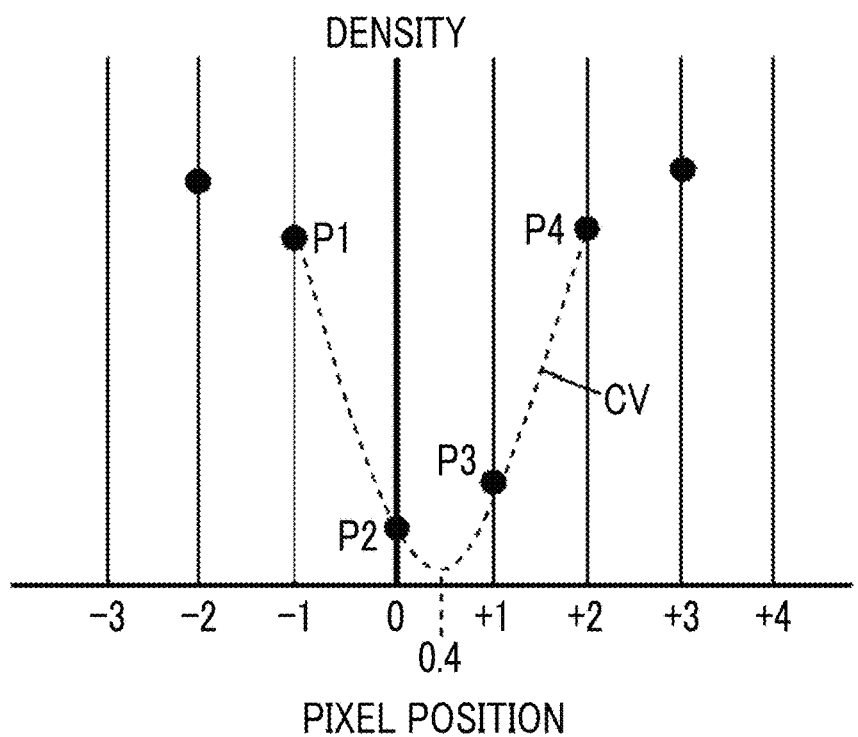
FIG. 11 is a diagram showing a state in which a density distribution is approximated into a curve.

With respect to the density distribution as in FIG. 10, the processing unit 110 (function calculating unit 110C) approximates the density distribution into a curve as in FIG. 11 and estimates a center pixel position as a real value (step S110: center estimating step). The approximation may be performed by obtaining a curve (a quadratic curve, a cubic curve, or the like) passing through a plurality of points of the density distribution. In order to obtain a center position, some points of the density distribution may be approximated into a curve. FIG. 11 shows an example in which points P1 to P4 are approximated into a quadratic curve CV. It is possible to obtain a peak position by differentiating this quadratic curve CV, and it is assumed that density peaks (becomes the darkest) at the pixel position of 0.4 (a real value) in the example of FIG. 11.

Figure 12:
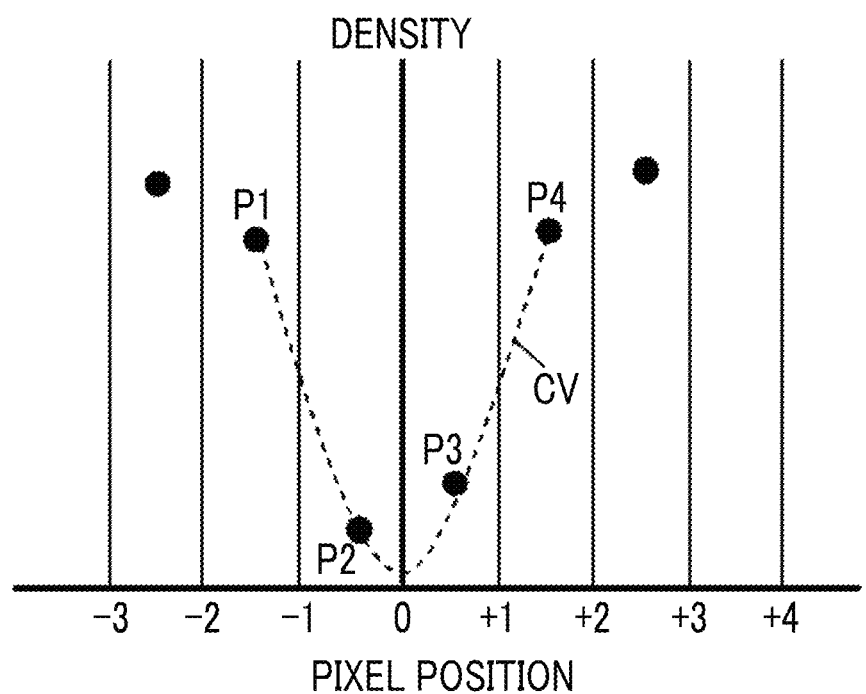
FIG. 12 is a diagram showing a state in which the density distribution is shifted and aligned.

Once the center of the density distribution is estimated in step S110, the function calculating unit 110C shifts the entire density distribution in the width direction such that density peaks at the pixel position of zero (step S112: aligning step). In the example of FIG. 11, the density distribution is shifted by −0.4 pixels. FIG. 12 shows an example of the shifted results.

Figure 13:
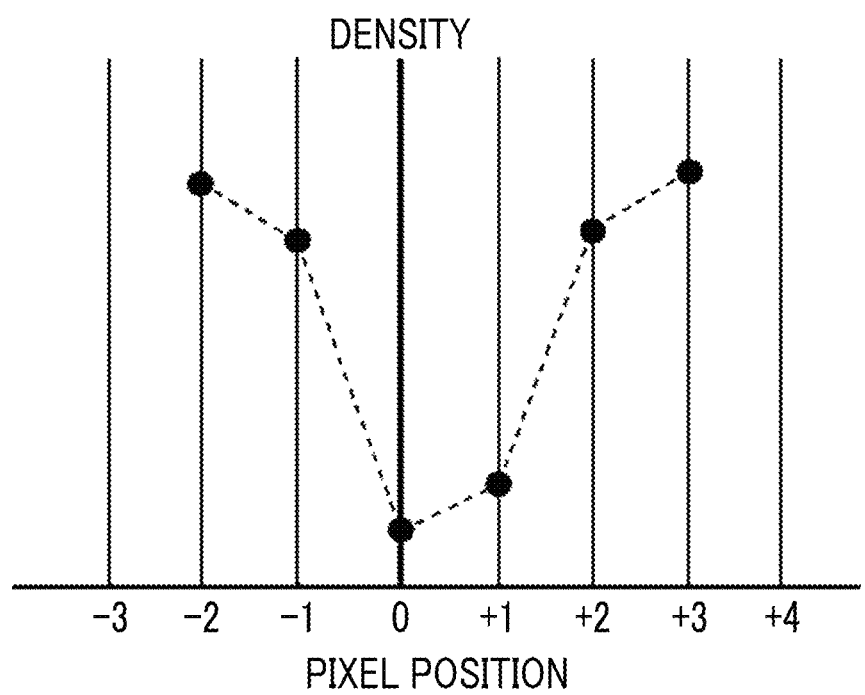
FIG. 13 is a diagram showing a state in which a density distribution is obtained by a method of the related art.

The function calculating unit 110C repeatedly performs the processes of step S110 (center estimating step) and step S112 (aligning step) on all the density distributions acquired in step S108 (density distribution acquiring step) (for "No" in step S114), and once these processes are completed for all the density distributions ("Yes" in step S114), the processing proceeds to step S116. By performing the processes of steps S110 and S112 on all the density distributions, it is possible to obtain a plurality of density distributions having the aligned centers, and it is possible to accurately obtain the probability distribution function shown below. In contrast to this, since in the method of the related art (for example, see the above-mentioned JP2013-195074A), the density at each pixel position is connected by a simple straight line to obtain a density distribution as in FIG. 13, it is impossible to obtain an accurate index.

In step S116, a probability distribution function corresponding to a plurality of density distributions having the aligned centers is calculated (function calculating step). Specifically, the nonlinear regression analysis of density data is performed by using a function F(x) such as the following equation (1) as a crack model so that parameters α, λ, and c are obtained. The parameters α and λ are parameters indicating a shape of the Gaussian function, and the parameter c is a parameter indicating a brightness around a crack.

$$F(x)=\alpha \times \exp\{-(\lambda \times x)^2/2\}+c \tag{1}$$

Once the parameters are calculated, the processing unit 110 (index generating unit 110D) generates an index indicating the width of the crack C1-2 based on the above-mentioned equation (1) (step S118: index generating step). Specifically, an integral value obtained by integration (integrating step) of "F(x)−c" is used as an index S1. This index S1 corresponds to the width of the crack C1-2.

Following step S118, the index generating unit 110D corrects the generated index according to a brightness around the crack, a distance to the crack, and a color around the crack (step S120: correcting step). For example, a value obtained by multiplying the index S1 by the correction coefficient $C_f(=f(c, d, g))$ which is a function of the brightness around the crack, the distance to the crack, and the color around the crack as in the following equation (2), is equal to a corrected index S2. In the equation (2), c is a parameter c indicating the above-mentioned brightness around the crack, d indicates the distance to the crack, and g indicates the color around the crack.

$$S2=S1 \times C_f \tag{2}$$

Figure 14:
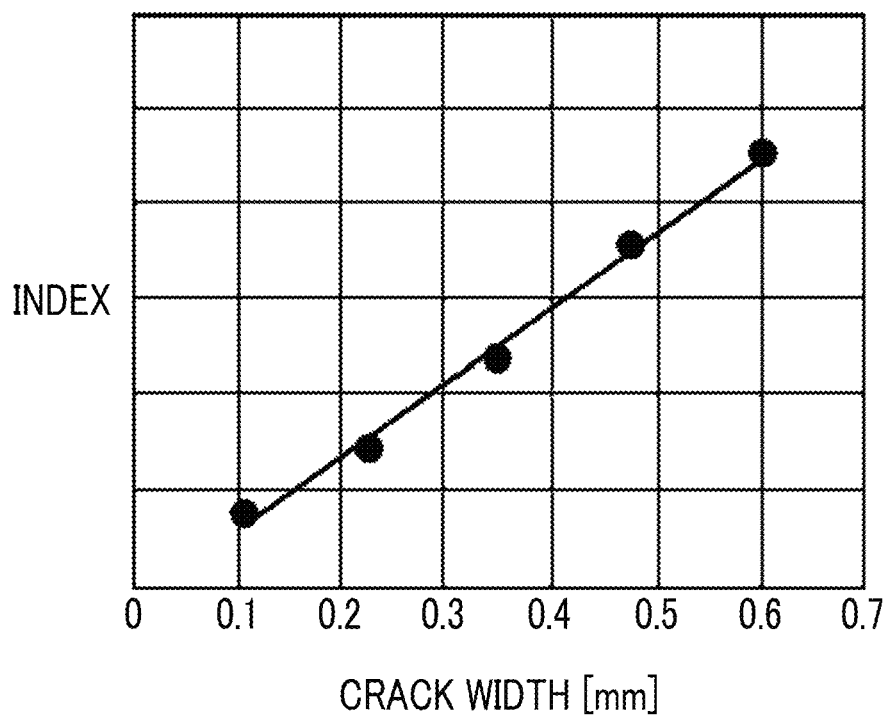
FIG. 14 is a diagram showing an example of a relationship between a crack width and an index.

In this way, it is possible to know the relationship between the width of the crack C1-2 and the value of the index S2. It is possible to recognize the relationship between the crack width and the index, by repeatedly performing the above-mentioned processes from step S102 to step S120 on other cracks having a width known (for example, cracks C1-1, C1-3, and C1-4 in FIG. 6). FIG. 14 shows an example of an obtained relationship. The relationship in FIG. 14 is a relationship in which the influence of the brightness around the crack, the distance to the crack, and the color around the crack is taken into consideration. The black circles in FIG. 14 are individual data indicating the relationship between the crack width and the index, and the straight line is a straight line obtained by approximating (for example, the least square approximation of) the data indicated by the black circles.

In the present embodiment, since an index is generated based on the probability distribution function corresponding to a plurality of density distributions having the aligned centers in this way, and the generated index is corrected based on the brightness or the like around the crack, it is possible to accurately and stably generate indices by reducing the influence of measurement environment or noise. Then, it is possible to recognize the relationship between the width of a subject and an index, by generating the index for the subject (the crack C1-2 in the above-mentioned Example) Having a Width Known.

<Measurement of Crack Width>

Figure 15:
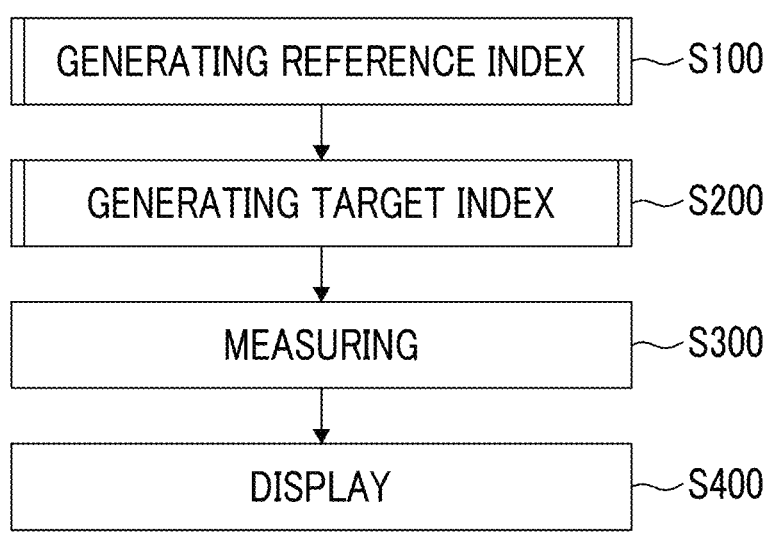
FIG. 15 is a flowchart showing the processing of measuring a crack width.

Next, a method of measuring the crack width based on the generated index will be described. FIG. 15 is a flowchart showing the processing for a method of measuring the crack width according to this embodiment. In step S100, as described above, the processing unit 110 performs the processing from step S102 to step S120 on the reference subject (herein, the crack C1-2 having a width known), and this is the processing of obtaining the relationship between the crack width and the index as shown in FIG. 14 (reference index generating step). In order to improve the accuracy of the reference index, it is preferable to generate the index by acquiring the density distribution for a portion where a crack width is constant or a width is regarded to be constant for the accuracy required for index generation and measurement.

In the generation of the reference index, the crack C1-2 as the reference subject may be an actual crack (naturally-generated crack) or artificially-created crack. A crack scale or the like having a width known may be created artificially and used as a reference subject.

Figure 16:
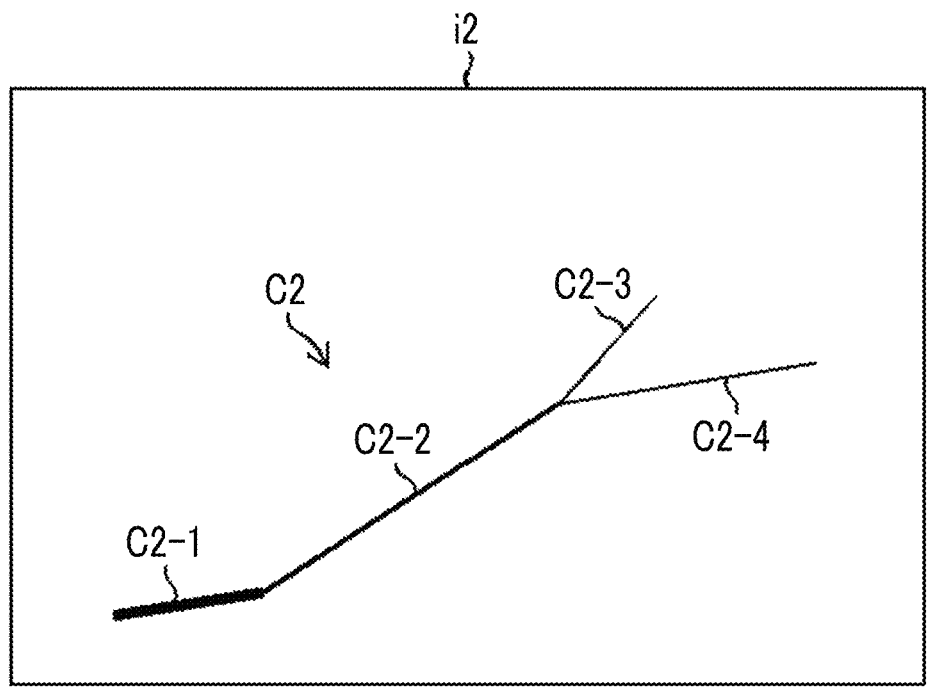
FIG. 16 is a diagram showing an image of cracks which are targets to be measured.

Next, the processing unit 110 performs the same processing as the processing from step S102 to step S120 on a crack (target subject) which is a target to be measured, and generates an index (second index) indicating a crack width (step S200: target index generating step). Herein, it is assumed that the target subject is a crack group C2 (composed of cracks C2-1 to C2-4) shown in the example of FIG. 16, and an image i2 is acquired for the crack group C2. For the target subject (herein, the crack group C2), it suffices to acquire the density distribution at least at one portion where the width is measured. However, depending on the measurement environment such as a case where the width is regarded to be constant in the vicinity of the measured portion, an index may be generated based on the probability distribution function obtained by acquiring a plurality of density distributions similarly to the above-mentioned step S108 (see steps S110 to S118) so that the measurement accuracy is improved.

Figure 17:
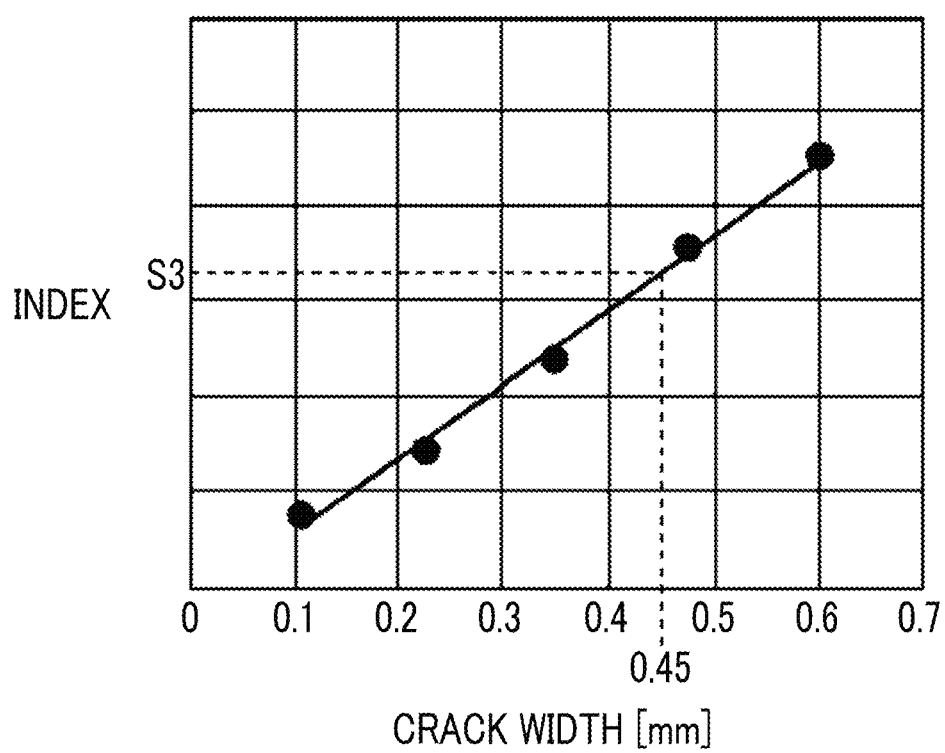
FIG. 17 is a diagram showing a state in which a crack width of a target to be measured is obtained using the generated index.

Once an index S3 (the second index) indicating the width of the target subject is obtained in step S200 for a crack (for example, a crack C2-2) constituting the crack group C2, the processing unit 110 (measuring unit 110E) measures a width of the target subject (step S300: measuring step) by comparing the index S3 with the relationship between the crack width and the index for the reference subject (see FIG. 14). FIG. 17 shows an example of measuring in this way. In the example of FIG. 17, the crack width for the index S3 is measured as 0.45 mm.

As described above, in the measuring method according to the present embodiment, it is possible to accurately measure the width of the subject using the index generated by the above-described index generating method.

<Display of Measurement Results>

Once the width of the crack by the processes of steps S100 and S200 is measured, the processing unit 110 (display control unit 110F) displays information indicating the width on the display unit 130 (step S400: display step). Displaying in step S400 may be performed, for example, by associating the width of the crack with any one of letters, numbers, symbols, or colors, or a combination thereof. Together with the information indicating such a width, the image of the reference subject or the target subject, the density distribution at each measured position, the obtained probability distribution function or the like (see FIGS. 6 to 17) may be displayed in connection with one another. The display control unit 110F appropriately reads out an image and information stored in the storage unit 120 (cracked image 120A, the reference index 120B, target index 120C, and the measurement results 120D; see FIG. 4) to perform such a display.

Figure 18:
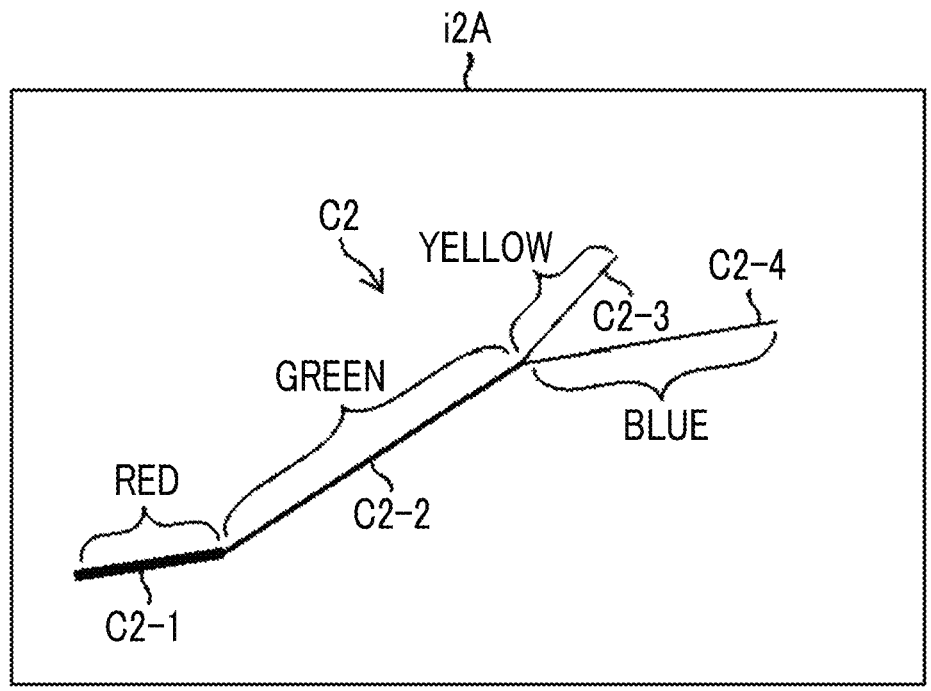
FIG. 18 is a diagram showing a display example of measurement results.
Figure 19:
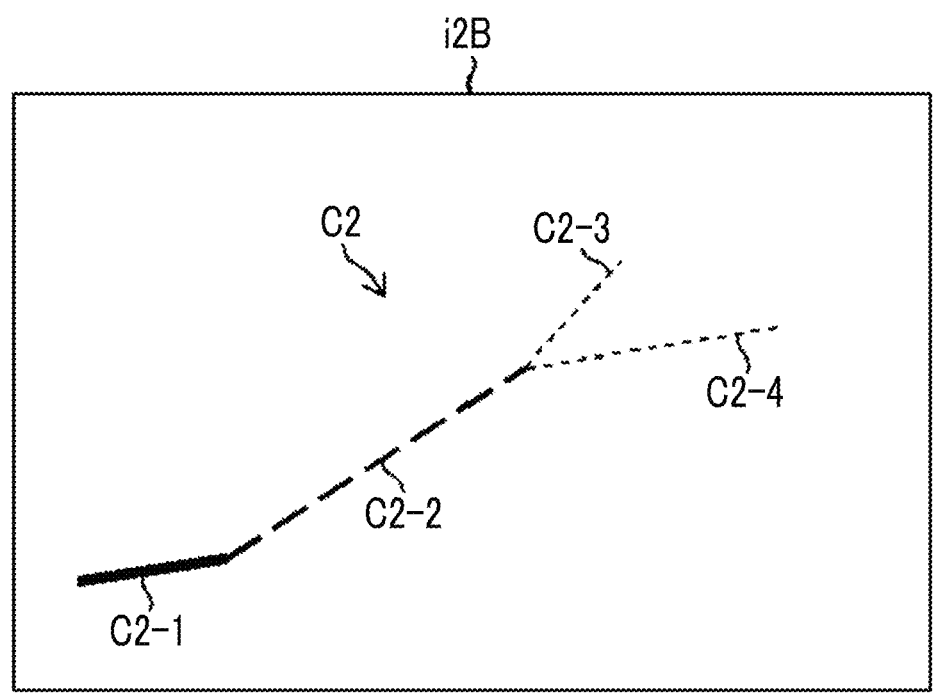
FIG. 19 is a diagram showing another display example of the measurement results.
Figure 20:
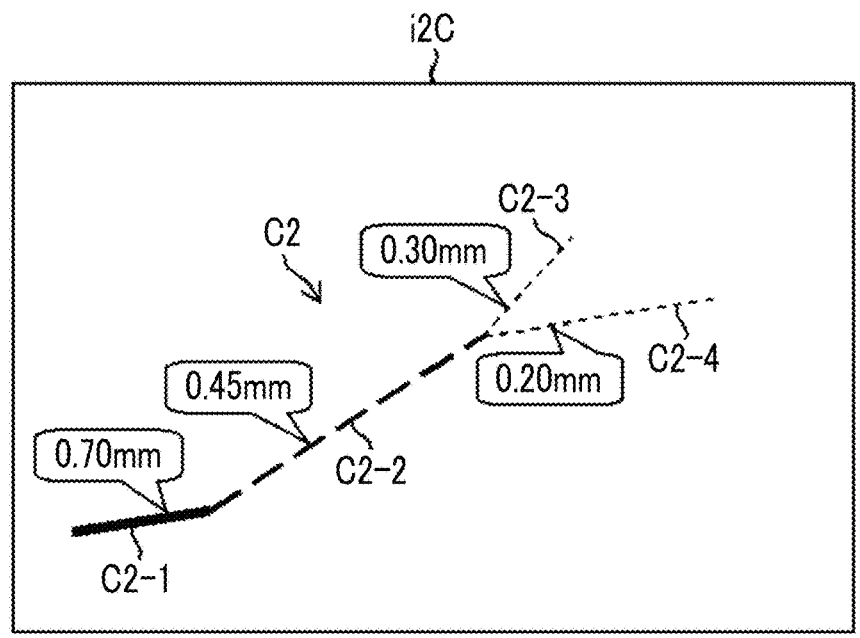
FIG. 20 is a diagram showing still another display example of the measurement results.
Figure 21:
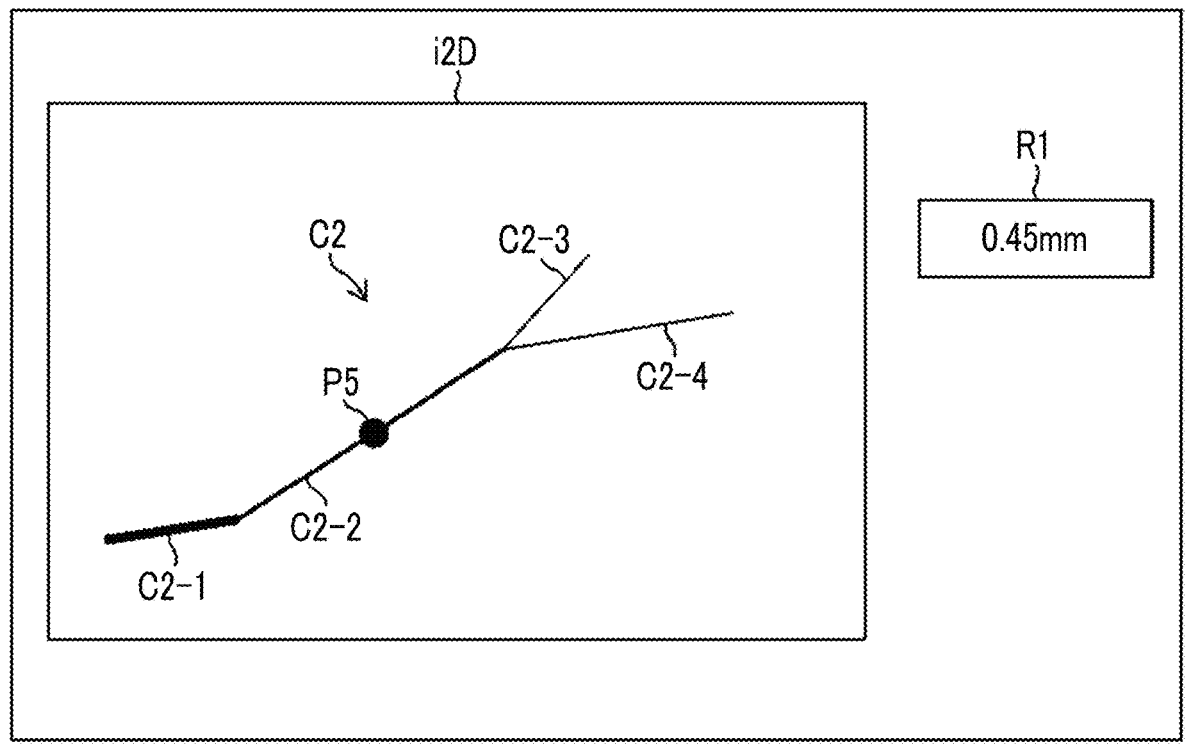
FIG. 21 is a diagram showing still another display example of the measurement results.

FIGS. 18 to 21 are diagrams showing examples of displaying in step S400. FIG. 18 is a diagram showing an image i2A in which the image of cracks is subjected to coloring according to the width of cracks, and cracks C2-1, C2-2, C2-3, and C2-4 are respectively displayed in red, green, yellow, and blue (the widest crack is displayed in red, the following cracks are displayed in order of green and yellow, and the narrowest crack is displayed in blue). FIG. 19 is a diagram showing an image i2B in which the image of cracks is displayed with different types of lines according to the width of the cracks, the widest crack C2-1 is indicated by a solid line, and narrow cracks C2-2, C2-3, and C2-4 are indicated by dotted lines at intervals corresponding to the width. FIG. 20 is a diagram showing an image i2C in which numerical values indicating the width of cracks are displayed with speech balloons for the image i2B in FIG. 19. FIG. 21 is a diagram showing an example in which a width at a point P5 designated on the crack C2-2 in the image i2D is numerically indicated in an area R1. In the example of FIG. 21, in a case where the widths at each point of the cracks are stored in advance in the storage unit 120 (measurement results 120D) and a point on the crack is designated (for example, a user clicks a point on the crack by the pointing device of the operation unit 140), the display control unit 110F may display the width at that point in the area R1.

In this embodiment, it is possible to easily recognize the crack width by such a display.

Another Example of an Index Generation and Measurement

In the above-described embodiment, the probability distribution function obtained based on the plurality of density distributions is integrated as an index. However, the index in the index generating method, the measuring method, and the index generating apparatus of the present invention is not limited to these embodiments. Other examples of an index generation and measurement are described below.

Another Example 1

In this example, the function F(x) of the above-mentioned equation (1) is not integrated, but parameters α, λ, and c indicating the shape of the function are used as an index. For the reference subject, the crack width $W_{th}$ is represented as $W_{th} = f(\alpha, \lambda, c)$ which is a function of the parameters α, λ, and c, and the relationship between the parameters α, λ, and c, and the crack width $W_{th}$ is obtained (reference index generating step). Similarly, for the target subject, parameters α, λ, and c are obtained (target index generating step) and compared with parameters for the reference subject to measure the crack width (measuring step).

Another Example 2

Figure 22:
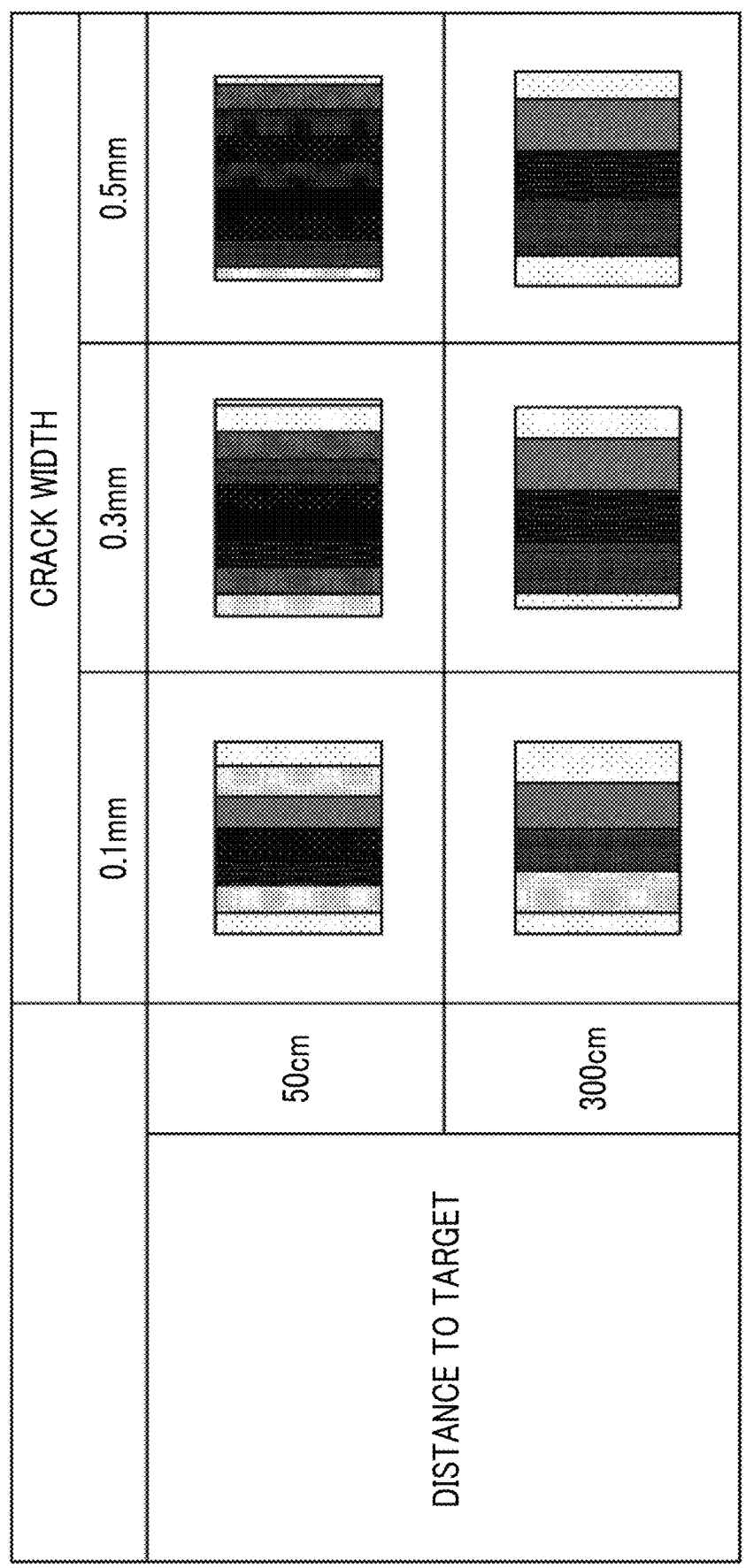
FIG. 22 is a diagram showing an example in which a two-dimensional density distribution is generated as an index.

In this example, a two-dimensional pattern (two-dimensional image) of density corresponding to the function F(x) of the above-mentioned equation (1) is used as an index. For such a reference subject, a plurality of two-dimensional patterns are generated according to the crack width and the distance to the crack (reference index generating step). A two-dimensional pattern for such a reference subject matches the measured portion in the image of the target subject, and from the most suitable pattern (index), the crack width is measured (measuring step). FIG. 22 shows an example of a two-dimensional pattern according to the crack width and the distance to the crack for the reference subject.

Application Example to Subject Other than Cracks

In the above-described embodiment, a case where the cracks generated in the bridge 1 of a concrete structure is the subject has been described. However, the index generating method, the measuring method, and the index generating apparatus of the present invention may be also applied to linear subjects other than cracks as described below.

Application Example 1

This example is an example in which the index generating method, the measuring method, and the index generating apparatus according to the embodiment of the present invention are applied to the measurement of a blood vessel image generated by an endoscope system. In the example, the present invention is applied to the measurement of a thickness (width) of a blood vessel as a subject.

<Configuration of Endoscope System>

Figure 23:
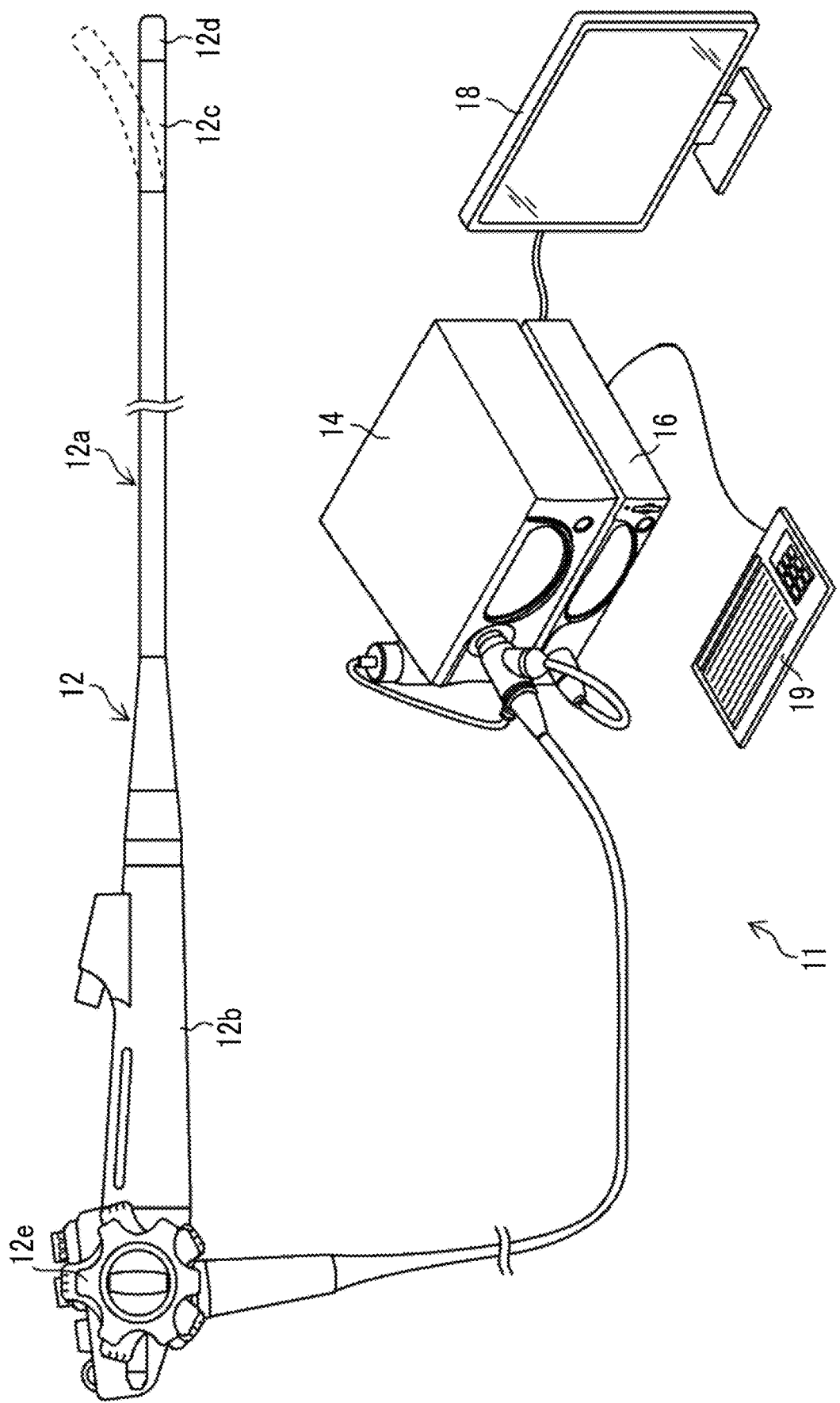
FIG. 23 is a diagram showing a configuration of an endoscope system.

FIG. 23 is an appearance diagram showing a main configuration of the endoscope system. As shown in FIG. 23, the endoscope system 11 includes an endoscope 12, a light source apparatus 14, a processor apparatus 16 (index generating apparatus and measuring apparatus), a monitor 18 (display unit), and a console 19 (operation unit). The endoscope 12 is optically connected to the light source apparatus 14 and is electrically connected to the processor apparatus 16.

The light source apparatus 14 has four types of Light Emitting Diodes (LEDs) that emit the narrowband light of purple, blue, green, and red, and one or a plurality of LEDs may be caused to emit light according to an observation purpose. By causing all the LEDs to emit light, it is possible to emit white light (broadband light).

An illumination optical system (not shown) is provided at the distal end portion 12d of the endoscope 12, and an observation target is irradiated with illumination light that is, through the illumination optical system, emitted by the above-described LEDs. The imaging optical system has an objective lens, a zoom lens, and an imaging sensor (not shown), and acquires an image of the observation target obtained by the irradiation of the illumination light.

The processor apparatus 16 (the image input unit, the density distribution acquiring unit, the function calculating unit, and the index generating unit) has various signal processing circuits other than a Central Processing Unit (CPU), a Read Only Memory (ROM), a Random Access Memory (RAM), generates image data of the subject from the image of the observation target acquired by the imaging optical system and performs image processing such as color emphasis processing and structure emphasis processing according to the observation purpose.

Figure 24:
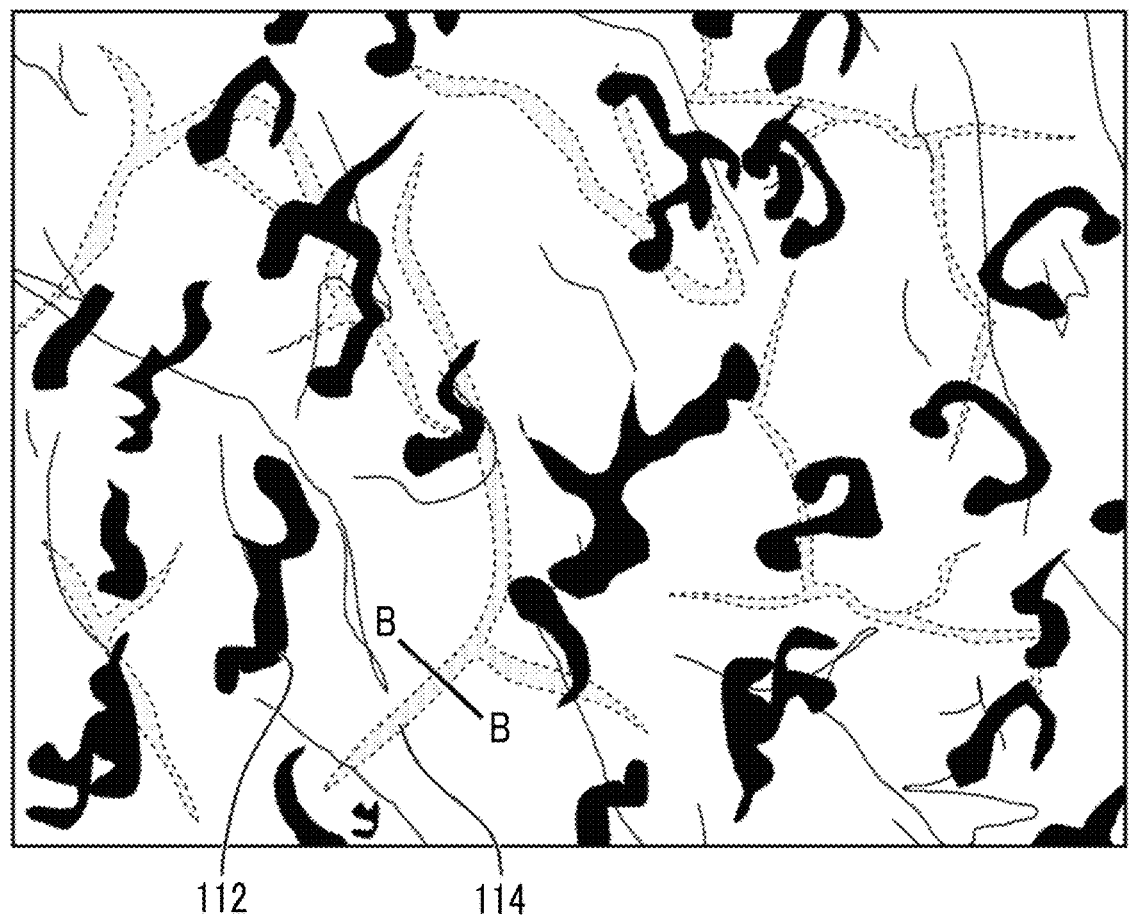
FIG. 24 is a diagram showing an example of a blood vessel emphasized image.

In the endoscope system 11 having such a configuration, the subject is alternately irradiated with two types of narrowband light (for example, purple light and blue light) having different center wavelengths to obtain two narrowband images (for example, a first image corresponding to purple light and a second image corresponding to blue light), and processing such as light quantity correction and logarithmic conversion is performed on the first image and the second image and then difference processing for generating a difference image between the first image and the second image is performed. By assigning the logarithmically-converted first image to a luminance channel (Y) and assigning the difference image to the color difference channels (Cr, Cb), it is possible to generate a blood vessel emphasized image (YCC image) in which polar surface layer blood vessels in a polar surface layer under the submucosa are emphasized. The generated YCC image may be converted into an RGB image by a known relational equation. FIG. 24 shows an example of the obtained blood vessel emphasized image. The blood vessel emphasized image may be displayed on the monitor 18. In such a blood vessel emphasized image, it is possible to distinguish a polar surface layer blood vessel and a surface layer blood vessel by color, and it is easy to observe a blood vessel. Since it is difficult to illustrate colors in FIG. 24, the polar surface layer blood vessel 112 is displayed in black, and the surface layer blood vessel 114 is displayed in gray.

In the blood vessel emphasized image as in FIG. 24, for example, the width (thickness) may be obtained by the above-mentioned method using the surface layer blood vessel 114 as a "linear subject", and thus information useful for diagnosis may be obtained. For example, the width of the surface layer blood vessel 114 taken along the B-B line in FIG. 24 may be obtained. The reference subject (the subject having a width known) for the surface layer blood vessel 114 may be a blood vessel whose width (thickness) is determined by other methods, a phantom simulating a blood vessel, or an optical simulation result. The calculation of such a blood vessel width may be performed not only on surface layer blood vessels, but also on blood vessels at other depths, similarly.

Application Example 2

This example is an example in which the present invention is applied to the measurement of a wiring pattern formed by an inkjet printer. In the inkjet printer, a conductive ink is ejected onto a substrate to form a wiring pattern, and the width of the wiring pattern formed in this way may be measured by the index generating method, the measuring method, and the index generating apparatus according to the embodiment of the present invention.

Figure 25:
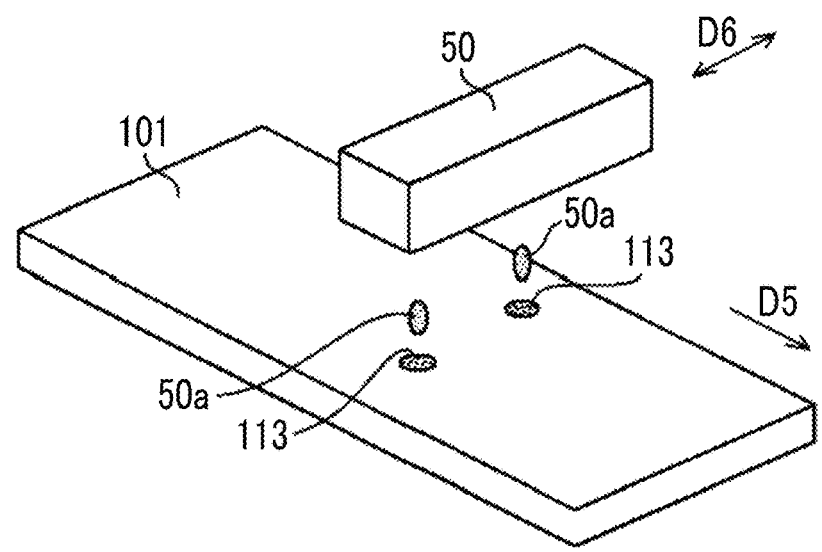
FIG. 25 is a diagram showing a state in which a wiring pattern is formed by droplet ejection of a conductive ink.
Figure 26:
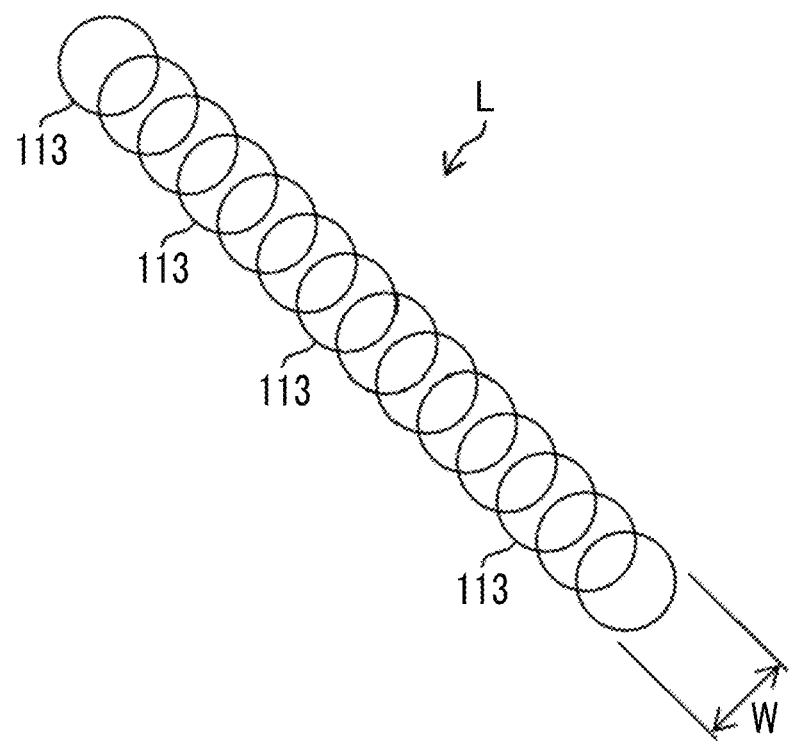
FIG. 26 is a diagram showing a wiring pattern formed of a conductive ink.

FIG. 25 is a diagram showing a state in which a wiring pattern is formed by droplet ejection of a conductive ink. In FIG. 25, an ink droplet 50a of a conductive ink is ejected from an ejection unit 50 while the substrate 101 is being transported in a transport direction D5, and a wiring pattern is formed by continuously forming dots 113 on the substrate 101. In the formation, the ejection unit 50 is appropriately moved in the direction of an arrow D6 (a direction orthogonal to the transport direction D5). FIG. 26 is a diagram showing a wiring L (an example of a target subject) formed in this way. The width W of the wiring L may be measured by an imaging unit and an image processing unit provided in an inkjet printer, or may be separately captured and measured by a measuring apparatus. The imaging of the wiring L and the measurement of the width W may be performed, for example, by the measuring apparatus 10 of the above-described embodiment according to the procedures shown in FIGS. 5 and 15. Incidentally, in the measurement of such a wiring pattern, the reference subject may be a wiring whose width is obtained by another method, or an artificially-created subject such as a crack scale for the crack.

Other Application Examples

In addition to the above-described application examples 1 and 2, the index generating method, the measuring method, and the index generating apparatus according to the embodiment of the present invention may be applied to the measurement of the width of a white line or a yellow line drawn, or the like on a tree, a river, and a road.

Although the embodiments and other examples of the present invention have been described above, the present invention is not limited to the above-described embodiments and other examples, and various modifications are possible without departing from the spirit of the present invention.

EXPLANATION OF REFERENCES

1: bridge
2: deck
3: main girder
3A: joint portion
10: measuring apparatus
11: endoscope system
12: endoscope
12$d$: distal end portion
14: light source apparatus
16: processor apparatus
18: monitor
19: console
50: ejection unit
50$a$: ink droplet
101: substrate
102: camera
110: processing unit
110A: image acquiring unit
110B: density distribution acquiring unit
110C: function calculating unit
110D: index generating unit
110E: measuring unit
110F: display control unit
112: polar surface layer blood vessel
113: dots
114: surface layer blood vessel
120: storage unit
120A: cracked image
120B: reference index
120C: target index
120D: measurement results
130: display unit
140: operation unit
C1: crack group
C2: crack group
CV: quadratic curve
D5: transport direction
F(x): function
L: wiring
R1: area
S1: index
S2: index
S3: index
S100 to S120: each step of index generating method
S200 to S300: each step of measuring method
α: parameter
λ: parameter
c: parameter
$C_f$: correction coefficient
i1: image
i1R: image
i2: image
i2A: image
i2B: image
i2C: image
i2D: image

What is claimed is:

1. An index generating method comprising:
   an image input step of inputting an image obtained by imaging a linear subject;
   a density distribution acquiring step of acquiring, from the input image, a plurality of density distributions along a direction orthogonal to a width direction of the linear subject, which are density distributions in the width direction of the linear subject;
   a function calculating step of calculating a probability distribution function corresponding to the acquired plurality of density distributions; and
   an index generating step of generating an index indicating a width of the subject based on the calculated probability distribution function,
   wherein the density distribution is a density distribution indicating brightness in the width direction of the linear subject, and
   the subject is selected from a crack of a concrete structure and a crack in a road.

2. The index generating method according to claim 1, further comprising:
   an integrating step of integrating the calculated probability distribution function,
   wherein in the index generating step, the index is generated based on a result of the integration.

3. The index generating method according to claim 1, wherein, in the index generating step, a parameter indicating the calculated probability distribution function is generated as the index.

4. The index generating method according to claim 1, wherein in the index generating step, a two-dimensional image showing the calculated probability distribution function is generated as the index.

5. The index generating method according to claim 1, wherein in the index generating step, the index is generated according to a width of the subject and a distance to the subject.

6. The index generating method according to claim 1, further comprising:
   a correcting step of correcting the generated index based on information about the subject.

7. The index generating method according to claim 6, wherein the information includes at least one of a distance to the subject, a brightness around the subject, or a color around the subject.

8. The index generating method according to claim 1, further comprising:
   an image rotating step of rotating the input image such that the linear subject is disposed in a vertical direction of a front image,
   wherein in the density distribution acquiring step, the plurality of density distributions are acquired along the vertical direction of the rotated image.

9. The index generating method according to claim 1, further comprising:
   a center estimating step of estimating a center in a width direction of a density distribution for each of the plurality of density distributions; and
   an aligning step of aligning the centers by moving the plurality of density distributions in the width direction based on the estimated center,
   wherein in the function calculating step, a probability distribution function corresponding to the plurality of density distributions having the aligned centers is calculated.

10. The index generating method according to claim 1, wherein in the function calculating step, the probability distribution function is calculated by performing a regression analysis on the plurality of density distributions.

11. The index generating method according to claim 1, further comprising:
an imaging step of imaging the linear subject to acquire an image,
wherein in the image input step, the image acquired in the imaging step is input.

12. A measuring method comprising:
a reference index generating step of generating an index by using the index generating method according to claim 1 for a reference subject having a width known;
a target index generating step of generating, for comparison with the index, a second index for a target subject which is a target to be measured; and
a measuring step of measuring a width of the target subject by comparing the second index generated for the target subject with the index generated for the reference subject.

13. The measuring method according to claim 12, further comprising:
a display step of displaying information indicating the width obtained by the measurement.

14. An index generating apparatus comprising a processing circuitry, wherein the processing circuitry is configured to:
input an image obtained by imaging a linear subject;
acquire, from the input image, a plurality of density distributions along a direction orthogonal to a width direction of the linear subject, which are density distributions in the width direction of the linear subject;
calculate a probability distribution function corresponding to the acquired plurality of density distributions; and
generate an index indicating the width of the subject based on the calculated probability distribution function,
wherein the density distribution is a density distribution indicating brightness in the width direction of the linear subject, and
the subject is selected from a crack of a concrete structure and a crack in a road.

* * * * *